US012191485B2

United States Patent
Liang et al.

(10) Patent No.: US 12,191,485 B2
(45) Date of Patent: Jan. 7, 2025

(54) ULTRATHIN FILM COATING AND ELEMENT DOPING FOR LITHIUM-ION BATTERY ELECTRODES

(71) Applicant: The Curators of the University of Missouri, Columbia, MO (US)

(72) Inventors: Xinhua Liang, Rolla, MO (US); Yan Gao, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 223 days.

(21) Appl. No.: 17/337,641

(22) Filed: Jun. 3, 2021

(65) Prior Publication Data

US 2021/0384504 A1    Dec. 9, 2021

Related U.S. Application Data

(60) Provisional application No. 63/034,239, filed on Jun. 3, 2020.

(51) Int. Cl.
*H01M 4/525* (2010.01)
*H01M 4/04* (2006.01)
*H01M 4/505* (2010.01)
*H01M 10/0525* (2010.01)

(52) U.S. Cl.
CPC ......... *H01M 4/525* (2013.01); *H01M 4/0428* (2013.01); *H01M 4/505* (2013.01); *H01M 10/0525* (2013.01)

(58) Field of Classification Search
CPC ............. H01M 10/0525; H01M 4/525; H01M 4/0428; H01M 4/505
See application file for complete search history.

(56) References Cited

U.S. PATENT DOCUMENTS

| 8,784,512 | B2 * | 7/2014 | Wadley ............. H01M 10/0562 429/188 |
| 9,196,901 | B2 * | 11/2015 | Se-Hee ................. H01M 4/366 |
| 9,917,295 | B2 * | 3/2018 | Elam .................... H01M 4/5815 |
| 10,490,807 | B2 * | 11/2019 | Zhu ......................... H01M 4/625 |
| 2009/0170001 | A1 * | 7/2009 | Roozeboom ........ H01M 10/044 429/225 |
| 2010/0242265 | A1 * | 9/2010 | Wadley ............. H01M 10/0436 29/623.5 |
| 2014/0255798 | A1 | 9/2014 | Amine et al. |
| 2015/0180023 | A1 | 6/2015 | Xiao et al. |
| 2015/0311524 | A1 | 10/2015 | Paulsen et al. |

(Continued)

FOREIGN PATENT DOCUMENTS

WO    2018222366    12/2018

OTHER PUBLICATIONS

Zou et al., "Revealing Cycling Rate-Dependent Structure Evolution in Ni-Rich Layered Cathode Materials", ACS Energy Letters, 2018, vol. 3, No. 10, pp. 2433-2440.

(Continued)

*Primary Examiner* — Christopher P Domone
*Assistant Examiner* — Jonathan William Estes
(74) *Attorney, Agent, or Firm* — Stinson LLP

(57) ABSTRACT

The present invention relates to various lithium ion battery cathodes as well as lithium ion batteries incorporating one or more of these cathodes. The present invention further relates to processes of preparing the lithium ion battery cathode.

19 Claims, 19 Drawing Sheets

(56) References Cited

U.S. PATENT DOCUMENTS

| | | | |
|---|---|---|---|
| 2017/0338471 | A1 | 11/2017 | Zheng et al. |
| 2018/0183095 | A1 | 6/2018 | Kwon et al. |
| 2020/0075948 | A1* | 3/2020 | Garella ............... H01M 4/0428 |
| 2020/0266440 | A1* | 8/2020 | Murakami ............ H01M 4/364 |
| 2020/0274161 | A1* | 8/2020 | Michot ................ H01M 4/587 |
| 2021/0074991 | A1* | 3/2021 | Gaben .................. H01M 4/505 |
| 2021/0218028 | A1* | 7/2021 | Su .......................... H05K 1/092 |
| 2021/0371297 | A1* | 12/2021 | Perkins ............... C23C 14/3414 |

OTHER PUBLICATIONS

Yoon et al., "Self-Passivation of a LiNiO2 Cathode for a Lithium-Ion Battery through Zr Doping", ACS Energy Letters, 2018, vol. 3, No. 7, pp. 1634-1639.

Li et al., "Study of the Failure Mechanisms of LiNi0.8Mn0.1Co0.1O2 Cathode Material for Lithium Ion Batteries", Journal of The Electrochemical Society, 2015, vol. 162, No. 7, pp. A1401-A1408.

Gilbert et al., "Transition Metal Dissolution, Ion Migration, Electrocatalytic Reduction and Capacity Loss in Lithium-Ion Full Cells", Journal of The Electrochemical Society, 2017, vol. 164, No. 2, pp. A389-A399.

Kalyani et al., "Various Aspects of LiNiO2 Chemistry: A Review", Science and Technology of Advanced Materials, 2016, vol. 6, No. 6, pp. 689-703.

Yoon et al., "Structural Stability of LiNiO2 Cycled above 4.2 V", ACS Energy Letters, 2017, vol. 2, No. 5, pp. 1150-1155.

Liu et al., "Spinel LiNi0.5Mn1.5O4 and Its Derivatives as Cathodes for High-Voltage Li-Ion Batteries", Journal of Solid State Electrochemistry, 2010, vol. 14, No. 12, pp. 2191-2202.

Cheng et al., "Realizing Superior Cycling Stability of Ni-Rich Layered Cathode by Combination of Grain Boundary Engineering and Surface Coating", Nano Energy, 2019, vol. 62, pp. 30-37.

Yan et al., "Tailoring Grain Boundary Structures and Chemistry of Ni-Rich Layered Cathodes for Enhanced Cycle Stability of Lithium-Ion Batteries", Nature Energy, Jul. 2018, vol. 3, No. 7, pp. 600-605.

Hall et al., "New Chemical Insights into the Beneficial Role of Al2O3 Cathode Coatings in Lithium-ion Cells", ACS Applied Materials & Interfaces, 2019, vol. 11, No. 15, pp. 14095-14100.

Schipper et al., "From Surface ZrO2 Coating to Bulk Zr Doping by High Temperature Annealing of Nickel-Rich Lithiated Oxides and Their Enhanced Electrochemical Performance in Lithium Ion Batteries", Advanced Energy Materials, 2018, vol. 8, No. 4, 10 pages.

Xie et al., "Atomic Layer Deposition of Stable LiAlF4 Lithium Ion Conductive Interfacial Layer for Stable Cathode Cycling", ACS Nano, 2017, vol. 11, No. 7, pp. 7019-7027.

Lee et al., "Li3PO4 Surface Coating on Ni-Rich LiNi0.6Co0.2Mn0.2O2 by A Citric Acid Assisted Sol-Gel Method: Improved Thermal Stability and High-Voltage Performance", Journal of Power Sources, 2017.05.042, 2017, vol. 360, pp. 206-214.

Kim et al., "Extending the Battery Life Using an Al-Doped Li[Ni0.76Co0.09Mn0.15]O2 Cathode with Concentration Gradients for Lithium Ion Batteries", ACS Energy Letters, 2017, vol. 2, No. 8, pp. 1848-1854.

Yoon et al., "Cation Ordering of Zr-Doped LiNiO2 Cathode for Lithium-Ion Batteries", Chemistry of Materials, 2018, vol. 30, No. 5, pp. 1808-1814.

Wu et al., "Improving the Reversibility of the H2-H3 Phase Transitions for Layered Ni-Rich Oxide Cathode Towards Retarded Structural Transition and Enhanced Cycle Stability", Nano Energy, 2019, vol. 59, pp. 50-57.

Sun et al., "Nanostructured High-Energy Cathode Materials for Advanced Lithium Batteries" Nature materials, Oct. 7, 2012, vol. 11, No. 11, 6 pages.

Li et al., "Synthesis of Full Concentration Gradient Cathode Studied by High Energy X-Ray Diffraction", Nano Energy, 2016, vol. 19, pp. 522-531.

Nam et al., "Capacity Fading of Ni-Rich NCA Cathodes: Effect of Microcracking Extent", ACS Energy Letters, 2019, vol. 4, No. 12, pp. 2995-3001.

Han et al., "From Coating to Dopant: How the Transition Metal Composition Affects Alumina Coatings on Ni-Rich Cathodes", ACS Applied Materials & Interfaces, 2017, vol. 9, No. 47, pp. 41291-41302.

David et al., "Unveiling the Role of Al2O3 in Preventing Surface Reconstruction During High-Voltage Cycling of Lithium-Ion Batteries", ACS Applied Energy Materials, 2019, vol. 2, No. 2, pp. 1308-1313.

Cheng et al., "Enhanced Cycleabity in Lithium Ion Batteries: Resulting from Atomic Layer Depostion of Al2O3 or TiO2 on LiCoO2 Electrodes", The Journal of Physical Chemistry C, 2012, vol. 116, No. 14, pp. 7629-7637.

Ho et al., "Crucial Role of Thioacetamide for ZrO2 Coating on the Fragile Surface of Ni-Rich Layered Cathode in Lithium Ion Batteries", Journal of Power Sources, 2020, vol. 450, 11 pages.

Xiao et al., "Nanoscale Manipulation of Spinel Lithium Nickel Manganese Oxide Surface by Multisite Ti Occupation as High-Performance Cathode", Adv Mater, 2017, vol. 29, No. 47, 12 pages.

Patel et al., "Employing Synergetic Effect of Doping and Thin Film Coating to Boost the Performance of Lithium-Ion Battery Cathode Particles", Sci Rep, 2016, vol. 6, 11 pages.

Gao et al., "Synergic Titanium Nitride Coating and Titanium Doping by Atomic Layer Deposition for Stable- and High-Performance Li-Ion Battery", Journal of The Electrochemical Society, 2018, vol. 165, No. 16, pp. A3871-A3877.

Ming et al., "Dual Elements Coupling Effect Induced Modification from Surface into Bulk Lattice for Ni-rich Cathode with Suppressed Capacity and Voltage Decay", ACS Applied Materials & Interfaces, 2020, vol. 12, pp. 8146-8156.

Zhang et al., "Surface Modification of Li1.2Mn0.54Ni0.13Co0.13O2 Cathode Material with Al2O3/SiO2 Composite for Lithium-Ion Batteries", Journal of The Electrochemical Society, 2019, vol. 166, No. 6, pp. A863-A872.

Liang et al., "Novel Processing to Produce Polymer/Ceramic Nanocomposites by Atomic Layer Deposition", J Am Ceram Soc, 2007, vol. 90, No. 1, pp. 57-63.

Shim et al., "Effects of Heat-Treatment Atmosphere on Electrochemical Performances of Ni-Rich Mixed-Metal Oxide (LiNi0.80Co0.15Mn0.05O2) as a Cathode Material for Lithium Ion Battery", Electrochimica Acta, 2014, vol. 138, pp. 15-21.

Zheng et al., "Effect of Calcination Temperature on the Electrochemical Properties of Nickel-Rich LiNi0.76Mn0.14Co0.10O2 Cathodes for Lithium-Ion Batteries", Nano Energy, 2018, vol. 49, pp. 538-548.

Wang et al., "Separating electronic and ionic conductivity in mix-conducting layered lithium transition-metal oxides", Journal of Power Sources, 2018, vol. 393, pp. 75-82.

Kang et al., "Factors That Affect Li Mobility in Layered Lithium Transition Metal Oxides", Physical Review B, 2006, vol. 74, No. 9, 7 pages.

Jung et al., "Oxygen Release and Its Effect on the Cycling Stability of LiNixMnyCozO2(NMC) Cathode Materials for Li-Ion Batteries", Journal of The Electrochemical Society, 2017, vol. 164, No. 7, pp. A1361-A1377.

Liu et al., "Significantly Improving Cycling Performance of Cathodes in Lithium Ion Batteries: The Effect of Al2O3 and LiAlO2 coatings on LiNi0.6Co0.2Mn0.2O2", Nano Energy, 2018, vol. 44, pp. 111-120.

Chen et al., "Tunable LiAlO2/Al2O3 Coating through a Wet-Chemical Method to Improve Cycle Stability of Nano-LiCoO2", ACS Applied Energy Materials, 2019, vol. 2, No. 5, pp. 3098-3113.

Bi et al., "Correlation of Oxygen Non-Stoichiometry to the Instabilities and Electrochemical Performance of LiNi0.8Co0.1Mn0.1O2 Utilized in Lithium Ion Battery", Journal of Power Sources, 2015, vol. 283, pp. 211-218.

Li et al., "Is Cobalt Needed in Ni-Rich Positive Electrode Materials for Lithium Ion Batteries?", Journal of The Electrochemical Society, 2019, vol. 166, No. 4, pp. A429-A439.

Li et al., "Updating the Structure and Electrochemistry of LixNiO2 for $0 \leq x \leq 1$", Journal of The Electrochemical Society, 2018, vol. 165, No. 13, pp. A2985-A2993.

Han et al., "Understanding the Role of Temperature and Cathode Composition on Interface and Bulk: Optimizing Aluminum Oxide

(56) References Cited

OTHER PUBLICATIONS

Coatings for Li-Ion Cathodes", ACS Applied Materials & Interfaces, 2017, vol. 9, No. 17, pp. 14769-14778.
Mäntymäki, Miia., "Atomic Layer Deposition and Lithium-ion Batteries : Studies on new materials and reactions for battery development", Doctoral University of Helsinki, 2017, 94 pages.
Hoskins et al., "Nonuniform Growth of Sub-2 Nanometer Atomic Layer Deposited Alumina Films on Lithium Nickel Manganese Cobalt Oxide Cathode Battery Materials", ACS Applied Nano Materials, 2019, vol. 2, No. 11, pp. 6989-6997.
Yu et al., "Slightly Fluorination of Al2O3 ALD Coating on Li1.2Mn0.54Co0.13Ni0.13O2 Electrodes: Interface Reaction to Create Stable Solid Permeable Interphase Layer", Journal of The Electrochemical Society, 2019, vol. 166, No. 10, pp. A2021-A2027.
PCT Search Report prepared for PCT/US2020/032299, mailed Dec. 3, 2020, 6 pages.
Sun, Y. K., et al., "High-energy cathode material for long-life and safe lithium batteries," Nature Materials, 2009, vol. 8, pp. 320-324.
Yan, P., et al., "Recent advances on the understanding of structural and composition evolution of LMR cathodes for Li-ion batteries," Frontiers in Energy Research, 2015, vol. 3, 22 pages.
Yu, H., et al., "High-energy cathode materials (Li2MnO3—LiMO2) for lithium-ion batteries," The Journal of Physical Chemistry Letters, 2013, vol. 4, pp. 1268-1280.
Goodenough, J. B., et al., "The Li-ion rechargeable battery: a perspective," Journal of the American Chemical Society, 2013, vol. 135, pp. 1167-1176.
Thackeray, M. M., et al., "Li2MnO3-stabilized LiMO2 (M=Mn, Ni, Co) electrodes for lithium-ion batteries," Journal of Materials Chemistry, 2007, vol. 17, No. 30, pp. 3112-3125.
Lim, J. H., et al., "Electrochemical characterization of Li2MnO3-Li[Ni1/3Co1/3Mn1/3]O2-LiNiO2 cathode synthesized via co-precipitation for lithium secondary batteries," Journal of Power Sources, 2009, vol. 189, 571-575.
Johnson, C. S., et al., "The significance of the Li2MnO3 component in 'composite' xLi2MnO3-(1-x) LiMn0. 5Ni0. 5O2 electrodes," Electrochemistry Communications, 2004, vol. 6, No. 10, pp. 1085-1091. Abstract only.
Kang, S. H., et al., "Enhancing the rate capability of high capacity xLi2MnO3-(1-x) LiMO2 (M=Mn, Ni, Co) electrodes by Li—Ni—PO4 treatment," Electrochemistry Communications, 2009, vol. 11, No. 4, pp. 748-751, Abstract only.
Nam, K. W., et al., "Combining in situ synchrotron X-ray diffraction and absorption techniques with transmission electron microscopy to study the origin of thermal instability in overcharged cathode materials for lithium-ion batteries," Advanced Functional Materials, 2013, vol. 23, pp. 1047-1063.
Aurbach, D., et al., "Design of electrolyte solutions for Li and Li-ion batteries: a review," Electrochimica Acta, 2004, vol. 50, Nos. 2-3, pp. 247-254.
Jiang, M., et al., "Electrochemical and structural study of the layered,"Li-excess" lithium-ion battery electrode material Li[Li1/9Ni1/3Mn5/9]O2," Chemistry of Materials, 2009, vol. 21, pp. 2733-2745.
Xu, B., et al., "Identifying surface structural changes in layered Li-excess nickel manganese oxides in high voltage lithium ion batteries: A joint experimental and theoretical study," Energy & Environmental Science, 2011, vol. 4, No. 6, 2223-2233.
Zheng, J., et al., "Functioning mechanism of AlF3 coating on the Li- and Mn-rich cathode materials," Chemistry of Materials, 2014, vol. 26, No. 22, pp. 6320-6327.
Wang, Z., et al., "Effect of amorphous FePO4 coating on structure and electrochemical performance of Li1.2Ni0.13Co0.13Mn0.54O2 as cathode material for Li-ion batteries," Journal of Power Sources, 2013, vol. 236, pp. 25-32.
Wu, Y., et al., "Surface modification of high capacity layered Li[Li0.2Mn0.54Ni0.13Co0.13]O2 cathodes by AlPO4," Journal of the Electrochemical Society, 2008, vol. 155, No., pp. A635-A641.
Cho, H. M., et al., "Effect of surface modification on nanostructured LiNi0.5Mn1.5O4 spinel materials," ACS Applied Materials & Interfaces, 2015, vol. 7, No. 30, pp. 16231-16239.
Kim, J. W., et al., "Surface chemistry of LiNi0.5Mn1.5O4 particles coated by Al2O3 using atomic layer deposition for lithium-ion batteries," Journal of Power Sources, 2015, No. 274, pp. 1254-1262.
Wang, Q. Y., et al, "High capacity double-layer surface modified Li[Li0.2Mn054Ni0.13Co0.13]O2 cathode with Improved rate capability," Journal of Materials Chemistry, 2009, vol. 19, pp. 4965-4972.
Sun, Y. K., et al, "The role of AlF3 coatings in improving electrochemical cycling of Li-enriched nickel-manganese oxide electrodes for Li-ion batteries, " Advanced Materials, 2012, vol. 24, No. 9, pp. 1192-1196.
Ding, F., et al., "Enhanced performance of Graphite anode materials by AlF3 coating for lithium-ion batteries," Journal of Materials Chemistry, 2012, vol. 22, No. 25, pp. 12745-12751.
Ding, J., et al., "Preparation and performance characterization of AlF3 as interface stabilizer coated Li1.24Ni0.12Co0.12Mn0.56O2 cathode for lithium-ion batteries," Applied Surface Science, 2017, vol. 106, pp. 21-29.
Lee, Y., et al., "Atomic layer deposition of metal fluorides using HF-pyridine as the fluorine precursor," Chemistry of Materials, 2016, vol. 28, No. 7, pp. 2022-2032.
Rozier, P., et al., "Review Li-rich layered oxide cathodes for next-generation Li-ion batteries: chances and challenges," Journal of The Electrochemical Society, 2015, vol. 162, No. 14, pp. A249-A2499.
Liu, Y., et al., "In situ transmission electron microscopy observation of pulverization of aluminum nanowires and evolution of the thin surface Al2O3 layers during lithiation-delithiation cycles," Nano Letters, 2011, vol. 11, No. 10, pp. 4188-4194.
Chen, Z., et al., "Role of surface coating on cathode materials for lithium-ion batteries," Journal of Materials Chemistry, 2010, vol. 20, No. 36, pp. 7606-7612.
Song, B., et al., "Structural evolution and the capacity fade mechanism upon long-term cycling in Li-rich cathode material," Physical Chemistry, Chemical Physics, 2012, vol. 14, pp. 12875-12883.
Gao, Y., et al., "Boosting the electrochemical performance of Li1.2Mn0.54Ni0.13Co0.13O2 by atomic layer-deposited CeO2 coating," ACS Omega, 2018, vol. 3, pp. 906-916.
Mohanty, D., et al., "Unraveling the voltage-fade mechanism in high-energy-density lithium-ion batteries: origin of the tetrahedral cations for spinel conversion", Chemistry of Materials, 2014, vol. 26, No. 21, pp. 6272-6280.
Hu, E., et al., "Evolution of redox couples in Li-and Mn-rich cathode materials and mitigation of voltage fade by reducing oxygen release.", Nature Energy, 2018, vol. 3, No. 8, pp. 1-31.
Yan, J., et al., "Recent progress in Li-rich layered oxides as cathode materials for Li-ion batteries", RSC Advances, 2014, vol. 4, No. 108, pp. 63268-63284. Abstract only.
Yang, L., et al. "Inhibition of electrolyte oxidation in lithium ion batteries with electrolyte additives", Electrochemical and Solid State Letters, 2009, vol. 12, No. 12, pp. A229-A231.
Bouayad, H., et al., "Improvement of electrode/electrolyte interfaces in high-voltage spinel lithium-ion batteries by using glutaric anhydride as electrolyte additive", The Journal of Physical Chemistry C, 2014, vol. 18, No. 9, pp. 4634-4648.
Xiao, B., et al . . . , "Highly stable Li1.2Mn0.54Co0.13Ni0.13O2 enabled by novel atomic layer deposited AlPO4 coating", Nano Energy, 2017, vol. 4, pp. 120-130.
Lu, Y. et al., "Probing the origin of enhanced stability of "AlPO4" nanoparticle coated LiCoO2 during cycling to high voltages: combined XRD and XPS studies", Chemistry of Materials, 2009, vol. 21, No. 19, pp. 4408-4424. Abstract only.
Eriksson, T., et al., "Influence of Temperature on the Interface Chemistry of LixMn2O4 Electrodes", Langmuir, 2002, vol. 18, No. 9, pp. 3609-3619.
Xie, J., et al., "Atomic layer deposition of stable LiAlF4 lithium ion conductive interfacial layer for stable cathode cycling", ACS Nano, 2017, vol. 1, No. 7, pp. 7019-7027.

(56) References Cited

OTHER PUBLICATIONS

Kuang, F., et al., "Electrochemical impedance spectroscopy analysis for oxygen reduction reaction in 3.5% NaCl solution", Journal of Solid State Electrochemistry, 2009, vol. 13, No. 3, pp. 385-390.

Gaberscek, M., et al., "The importance of interphase contacts in Li on electrodes: the meaning of the high-frequency impedance arc", Electrochemical and Solid State Letters, 2008, vol. 11, No. 10, A170-A174.

Li, G. R., et al., "AlF3-coated Li(Li0.17Ni0.25Mn0.58)O2 as cathode material for Li-ion batteries," Electrochimica Acta, 2012, vol. 78, pp. 308-315.

Johnson, C. S., et al., "Synthesis, characterization and electrochemistry of lithium battery electrodes: xLi2MnO3-(1-xLiMn0.333Ni0.333Co0.333O2 (0≤x≤0.7)," Chemistry of Materials, 2008, vol. 20, pp. 6095-6106.

Kim, J. S., et al., "Pre-conditioned layered electrodes for lithium batteries," Journal of Power Sources, 2006, vol. 153, No. 2, pp. 258-264.

Li, H. H., et al., "Changes in the Cation Ordering of Layered O3 LixNi0.5Mn0.5O2 during Electrochemical Cycling & to High Voltages: An Electron Diffraction Study," Chemistry of Materials, 2007, vol. 19, No. 10, pp. 1-118.

Breger, J., et a., "Effect of high voltage on the structure and electrochemistry of LiNi0.5Mn0.5O2: A joint experimental & and theoretical study," Chemistry of Materials, 2006, vol. 18, No. 20, pp. 4768-4781.

Zhang, et al., "Fluoroethylene carbonate additives to render uniform Li deposits in lithium metal batteries," Advanced Functional Materials, 2017, vol. 7, No. 10, pp. 1605989 (1-8).

Yu, D., et al., "Structural analysis of Li2MnO3 and related Li—Mn—O materials," Journal of The Electrochemical Society, 2011, vol. 158, pp. A1015-A1022.

\* cited by examiner

25Al-NMC811 ~3.0 nm

30Zr-NMC811 ~4.5 nm 0.204 nm (104)

~1.0 nm 0.204 nm (104) Point A

A-25Al-NMC811

~2.0 nm 0.204 nm (104) Point B

A-30Zr-NMC811

FIG. 9A
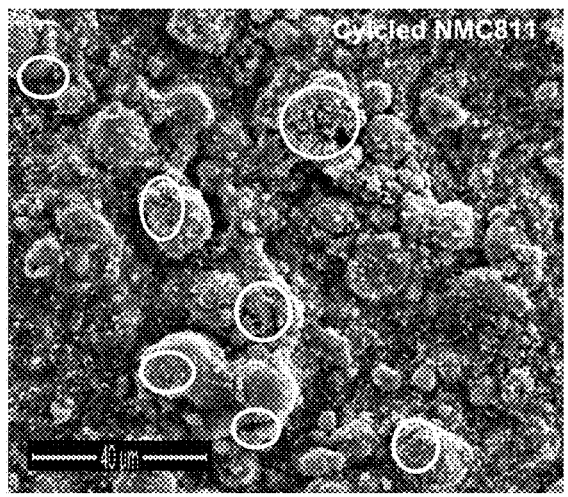
FIG. 9B
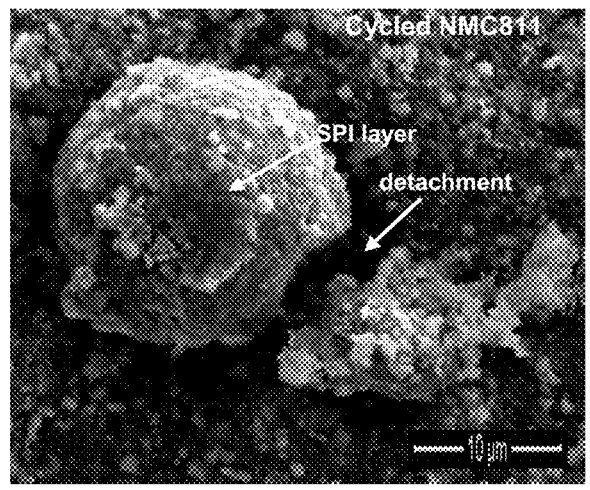
FIG. 9C
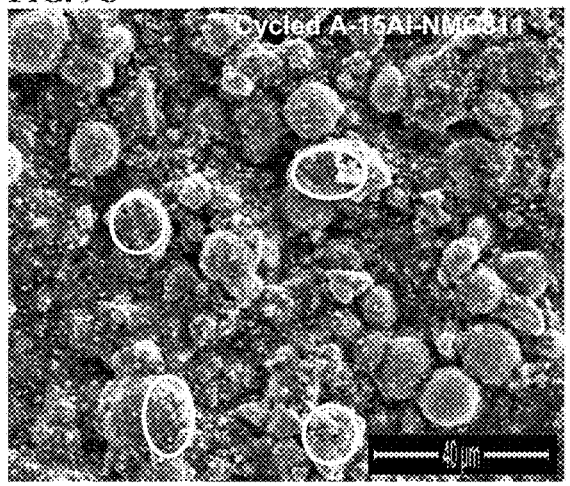
FIG. 9D
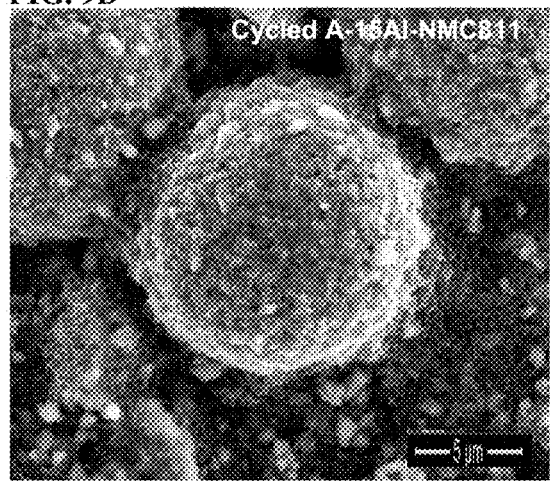
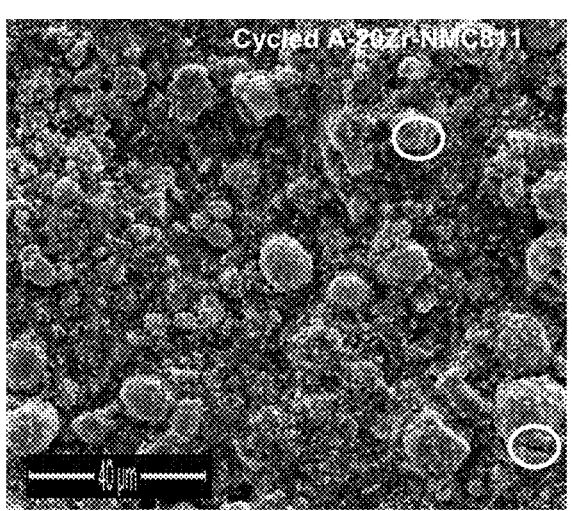
FIG. 9E
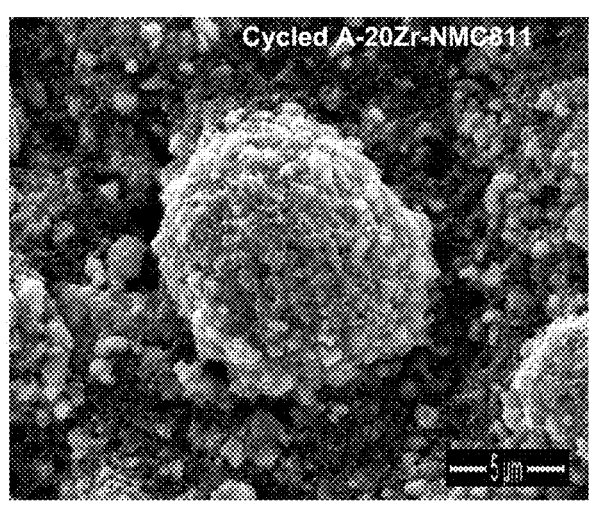
FIG. 9F

ULTRATHIN FILM COATING AND ELEMENT DOPING FOR LITHIUM-ION BATTERY ELECTRODES

REFERENCE TO RELATED APPLICATIONS

This patent application claims the benefit of U.S. Provisional Patent Application No. 63/034,239, filed Jun. 3, 2020, the entire disclosure of which is incorporated herein by reference.

STATEMENT REGARDING FEDERALLY SPONSORED RESEARCH

This invention was made with Government support under DMR 1464111 awarded by National Science Foundation. The Government has certain rights in the invention.

FIELD OF THE INVENTION

The present invention relates to various lithium ion battery cathodes as well as lithium ion batteries incorporating one or more of these cathodes. The present invention further relates to processes of preparing these lithium ion battery cathodes.

BACKGROUND OF THE INVENTION

Ni-rich $LiNi_{0.8}Mn_{0.1}Co_{0.1}O_2$ (NMC811) is considered as a next-generation Li-ion battery (LIB) cathode material powering electric vehicles, owing to its high specific capacity (>200 mAh/g), high average voltage (~3.8 V), and low cost (compared with $LiCoO_2$). However, its application is still restricted due to significant capacity fading and poor thermal characteristic. The reasons of degradation lie in the facts that active $Ni^{4+}$ cations form on the surface at high delithiated state and readily convert active layered structure to inert rocksalt phase, parasitic reactions catalyzed by transition metals on the cathode surface, and the intrinsic structural instability due to H2→H3 phase transition above ~4.1 V. Also, there is a sudden anisotropic lattice collapse during H2→H3 phase transition, which will cause microcracks and electrolyte penetration through them. These defects increase internal resistance of batteries, consume cyclable Li, and finally induce cell failure. The utilization of Ni-rich LIB cathodes has to compromise by limiting degree of discharge or upper cutoff voltage, which decreases energy density of batteries.

Work has been made to extend cycle life of Ni-rich LIB cathode, and representative approaches include surface coating, bulk doping, and tuning concentration gradient of cations. $LiNi_{0.8}Co_{0.15}Al_{0.05}O_2$ is another promising Ni-rich LIB cathode, which partially substitutes Ni with Al dopants to improve cyclic stability. Zr doping was also found to suppress antisitial defects and significant volume change in Ni-rich cathode. In addition, research unveiled new insights into the wide bandgap of $Al_2O_3$ and $ZrO_2$ coatings for surface stability. Recently, coating with post-annealing emerged as an effective method to address instability of cathode materials. Also, manipulation of cation gradient will be much easier through diffusion of cations induced by post-annealing of cathode particles coated with thin films. As mentioned above, Al and Zr has attracted much attention as both coating and doping materials, and many efforts have been made on those investigations. There remains a need to develop designs for stable performance of Ni-rich LIB cathodes.

BRIEF SUMMARY OF THE INVENTION

In various aspects, the present invention relates to a lithium ion battery cathode comprising: a doped lithium metal oxide comprising a dopant comprising zirconium; and a coating comprising alumina at least partially coating the doped lithium metal oxide.

Further aspects relate to a lithium ion battery comprising: a positive electrode comprising the lithium ion battery cathode as described herein, a negative electrode, a separator between the positive electrode and the negative electrode, and an electrolyte comprising lithium ions.

Still other aspects of the invention relate to a process of preparing the lithium ion battery cathode as described herein comprising depositing a coating comprising alumina on a doped lithium metal oxide comprising a dopant comprising zirconium.

Other objects and features will be in part apparent and in part pointed out hereinafter.

BRIEF DESCRIPTION OF THE DRAWINGS

FIG. 1A depicts a TEM image of a 25Al-NMC811 particle.

FIG. 1B depicts a TEM image of a 30Zr-NMC811 particle.

FIG. 1C depicts a TEM image of an A-25Al-NMC811 particle.

FIG. 1D depicts a TEM image of an A-30Zr-NMC811 particle.

FIG. 9A depicts SEM images of cycled cathodes of NMC811. The cycled cathodes were acquired after 200 cycles of charge-discharge at a 0.5C rate.

FIG. 9B depicts SEM images of cycled cathodes of NMC811 at higher magnification. The cycled cathodes were acquired after 200 cycles of charge-discharge at a 0.5C rate.

FIG. 9C depicts SEM images of cycled cathodes of A-15Al-NMC811. The cycled cathodes were acquired after 200 cycles of charge-discharge at a 0.5C rate.

FIG. 9D depicts SEM images of cycled cathodes of A-15Al-NMC811 at higher magnification. The cycled cathodes were acquired after 200 cycles of charge-discharge at a 0.5C rate.

FIG. 9E depicts SEM images of cycled cathodes of A-20Zr-NMC811. The cycled cathodes were acquired after 200 cycles of charge-discharge at a 0.5C rate.

FIG. 9F depicts SEM images of cycled cathodes of A-20Zr-NMC811 at higher magnification. The cycled cathodes were acquired after 200 cycles of charge-discharge at a 0.5C rate.

DETAILED DESCRIPTION OF THE INVENTION

Figure 1E:
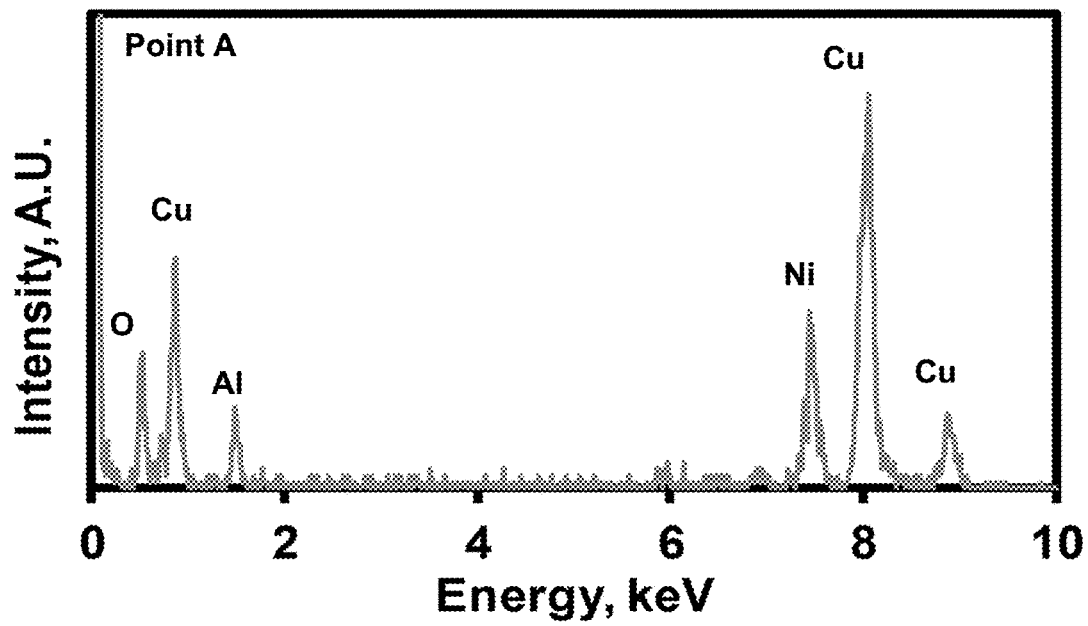
FIG. 1E depicts an EDS corresponding to point A in FIG. 1C.

The present invention relates to various lithium ion battery cathodes as well as lithium ion batteries incorporating one or more of these cathodes. The present invention further relates to processes of preparing these lithium ion battery cathodes.

Synergistic effects of coating one material and surface-doping another material were achieved by atomic layer deposition (ALD) and post-annealing. Al$_2$O$_3$ and ZrO$_2$ ALD were compared for their synergistic effects on a Ni-rich LiNi$_{0.8}$Mn$_{0.1}$Co$_{0.1}$O$_2$ (NMC811) cathode. The Al$_2$O$_3$ ALD coating was found to provide stable surface but sacrificed capacity of NMC811, and Zr-doping mainly improved structural stability of NMC811. Therefore, the Al$_2$O$_3$ ALD coating was performed on the Zr-doped NMC811. Surprisingly, after 200 cycles of charge-discharge, the discharge capacity of LIB half cells based on Al$_2$O$_3$ coated Zr-doped NMC811 remained 85.9% of its initial capacity of 208 mAh/g at a 0.5C rate in a voltage range of 2.5-4.5 V, while the initial capacities and capacity retentions were 203 mAh/g and 75.3% for Zr-modified NMC811, 195 mAh/g and 79.2% for Al-modified NMC811, and 206 mAh/g and 51.1% for pristine NMC811. As such, it was discovered that combining an alumina coating and Zr surface-doping can significantly improve the electrochemical performance of LIB electrodes. Alumina coating can provide a stable surface to lithium oxides such as NMC811, and Zr surface-doping can supplementally address the structural problems that alumina coatings cannot solve.

Accordingly, in various embodiments, the present invention relates to a lithium ion battery cathode comprising: a doped lithium metal oxide comprising a dopant comprising zirconium; and a coating comprising alumina at least partially coating the doped lithium metal oxide. In some embodiments, the doped lithium metal oxide comprises a lithium nickel manganese cobalt oxide. For example, the lithium metal oxide (without dopant) can be represented by the formula $LiNi_xMn_yCo_{1-x-y}O_2$ (as referred to as NMC). In certain embodiments, the doped lithium metal oxide comprises NMC811 (where x=0.8 and y=0.1).

Typically, the coating comprising alumina is ultrathin (i.e., nano-scale). In some embodiments, the thickness of the coating comprising alumina is from about 0.1 nm to 30 nm or from about 0.1 nm to 10 nm, or from about 0.1 nm to about 3 nm.

In further embodiments, the present invention relates to a lithium ion battery comprising: a positive electrode comprising the lithium ion battery cathode as described herein, a negative electrode, a separator between the positive electrode and the negative electrode, and an electrolyte comprising lithium ions.

In other embodiments, the invention relates to a process of preparing the lithium ion battery cathode as described herein comprising depositing a coating comprising alumina on a doped lithium metal oxide comprising a dopant comprising zirconium.

In some embodiments, the coating comprising alumina is deposited by atomic layer deposition. Also, in certain embodiments, the process further comprises annealing the lithium ion battery cathode. For example, annealing can be conducted in an oxygen-containing atmosphere and at a temperature of 600° C. or greater or about 750° C. or greater.

In certain embodiments, the process further comprises modifying a lithium metal oxide with a dopant comprising zirconium to form the doped lithium metal oxide. For example, the lithium metal oxide can be modified with the dopant comprising zirconium by atomic layer deposition. In some embodiments, the process further comprises annealing the doped lithium metal oxide prior to depositing the coating comprising alumina on a doped lithium metal oxide.

Having described the invention in detail, it will be apparent that modifications and variations are possible without departing from the scope of the invention defined in the appended claims.

EXAMPLES

In this work, the synergetic effect of coating and doping by Al or Zr on commercial NMC811 cathode particles was studied, and their different functions were compared. Atomic layer deposition (ALD) was applied for the conformal $Al_2O_3$ or $ZrO_2$ thin coating with various thicknesses, and then a post-annealing was performed to achieve Al or Zr doping with remaining surface coating. The samples were systematically characterized and tested for electrochemical performance. The mechanism of performance enhancement was studied and determined. The following non-limiting examples are provided to further illustrate the present invention.

Example 1

The following methods were used throughout the examples.

Atomic Layer Deposition:

NMC811 particles were purchased from NEI Corp without any further treatment. The particles were well stored in an Ar-filled glovebox. ALD was performed directly on NMC811 particles using a fluidized-bed reactor. Precursors included trimethylaluminum (TMA, Sigma Aldrich) and tetrakis(dimethylamino)zirconium (TDMAZ, Sigma Aldrich) as metal precursors for $Al_2O_3$ and $ZrO_2$ ALD, respectively, and deionized water as oxidant for both ALD processes. ALD reaction temperatures were set to 177° C. and 200° C. for $Al_2O_3$ and $ZrO_2$ ALD, respectively. Various thicknesses of metal oxides were coated, including 10, 15, and 25 for $Al_2O_3$ coatings (named as 10Al-NMC811, 15Al-NMC811, and 25Al-NMC811), and 10, 20, and 30 for $ZrO_2$ coatings (named as 10Zr-NMC811, 20Zr-NMC811, and 30Zr-NMC811). In addition, 4 cycles of $Al_2O_3$ or 5 cycles of $ZrO_2$ ALD were performed on NMC811 without further annealing to separately compare the effects of coating, and thus named as 4Al-NMC811 and 5Zr-NMC811. After ALD coating, the coated NMC811 particles were post-annealed in an $O_2$ flow with a flowrate of 60 sccm at 750° C. for 10 hr in a quartz tube, and the ramping rate was 10° C./min. The annealed samples will be named with "A", such as A-15Al-NMC811, and A-20Zr-NMC811. Pristine NMC811 particles were also annealed as a comparison.

Characterizations:

Transmission electron microscopy (TEM) was performed to study the evolution of surface features of as-coated and post-annealed samples using a FEI Tecnai F20 equipped with a 200 kV field emission gun and energy dispersive spectroscopy (EDS). X-ray diffraction (XRD) was carried out with a Philips X-Pert Multi-purpose Diffractometer at a scan rate of 1.3°/min with CuKα radiation and a wavelength of 1.5406 Å. X-ray photoelectron spectroscopy (XPS) was measured using Kratos Axis 165 through an introduction of AlKα radiation at 150 W and 15 kV. Scanning electron microscopy (SEM) was used to study the cathodes after electrochemical tests by using a FEI Helios NanoLab 600 FESEM equipped with Dualbeam FIB and electron dispersive spectroscopy (EDS). A-25Al-NMC811 and A-30Zr-NMC811 were investigated by SEM, TEM, and XPS due to their higher amount of Al and Zr for better view and stronger signal during characterizations. In case of overlapping between peaks of Zr and Pt in EDS scan, more points and longer dwelling time were used during EDS line scan of A-30Zr-NMC811 than those of A-25Al-NMC811. A-15Al-NMC811 and A-20Zr-NMC811 were investigated by XRD due to their better electrochemical performance.

Coin Cell Assembly:

The electrochemical performance was tested using CR2032 coin cells. For cathode fabrication, NMC811 powders, Super-P carbon black (Alfa Aesar), and polyvinylidenefluoride (PVDF, Alfa Aesar) were mixed in a weight ratio of 8:1:1 in a N-methyl pyrrolidone (NMP) solution. The slurry was formed and casted on an Al foil with a doctor blade. The wet paste was dried at 80° C. for about 7 min and then dried overnight at 120° C. in a vacuum oven. The resulted cathode was punched into round discs with a projected area of 0.71 $cm^2$, and the active materials was ~3.5 $g/cm^2$. Before coin cell assembly, the cathode discs were calendered with a force of 1.5 metric tons using a hydraulic pressing model. Coin cells was assembled in an Ar-filled glove box, with cathode discs, polypropylene separator (Celgard 2320), and Li foil (Sigma Aldrich), and two droplets of electrolyte (1M $LiPF_6$ solution with EC/DMC 1:1 v/v, Sigma Aldrich) on each side of the separator.

Electrochemical Tests:

The electrochemical tests were carried out using a Neware 8-channel battery test station. A voltage range of 2.5-4.3 V was used for cell formation and galvanostatic intermittent titration technique (GITT), and 2.5-4.5V was set for cyclic tests. The ex situ XRD measurement was performed on charged cathode discs from dissembled coin cells, which were galvanostatically charged to set cutoff voltage (4.1, 4.3, and 4.3 V) during the $1^{st}$ cycle at a 0.2C rate (1C=200 mA/g) and potentiostatically charged with a cutoff current density of a 0.03C rate. Three coin cells were tested in parallel for consistency of the cyclic tests, and a deviation of ~0.3% occurred for the initial specific capacity, and ~2% for capacity retentions. The coin cells were dissembled right after the voltage was reached in an Ar-filled glove box, and cathode discs were rinsed in DMC solvent to remove electrolyte residual, then dried in a vacuum oven, and sealed with Kapton film for XRD measurement. For GITT, the applied C rate was 0.1C, and coin cells were charged/discharged for 30 min with an interval time of 130 min (enough for equilibrium). Electrochemical impedance spectroscopy (EIS) was performed to study the impedance change for coin cells after charge/discharge cycling using a Biologic SP150 equipped with a low current accessory. After coin cells rested for about 3 hr, the EIS analysis was carried out in a frequency range of 1 MHz-10 mHz with an excitation signal of 5 mV. An EC-Lab software was used to fit the EIS data.

Example 2

Figure 1F:
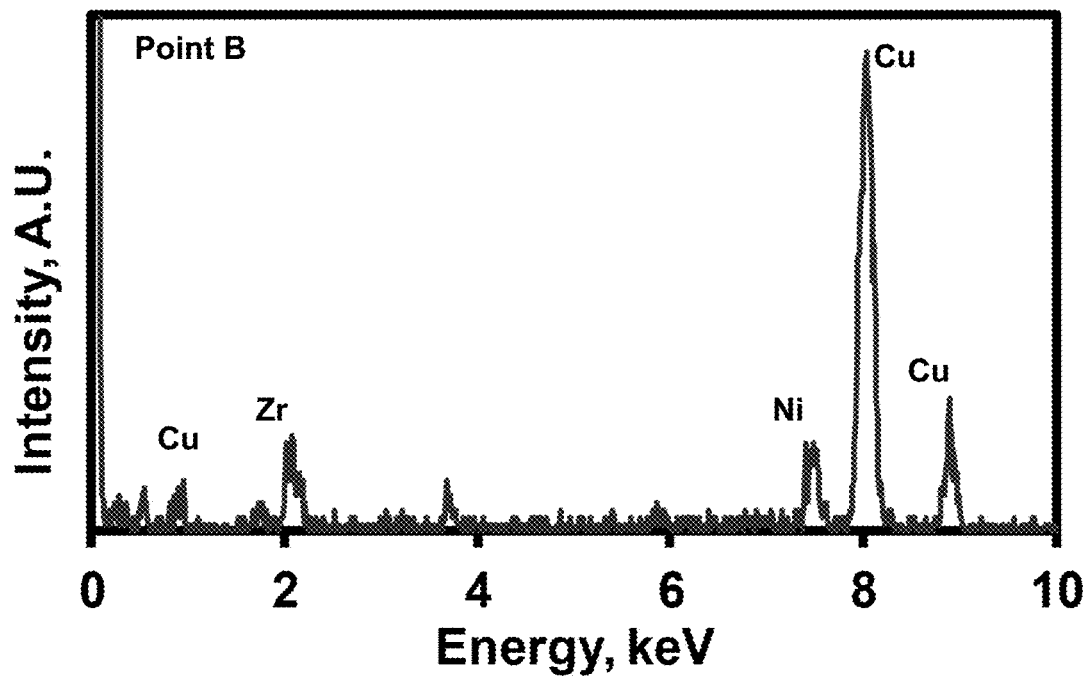
FIG. 1F depicts an EDS corresponding to point B in FIG. 1D.
Figure 1G:
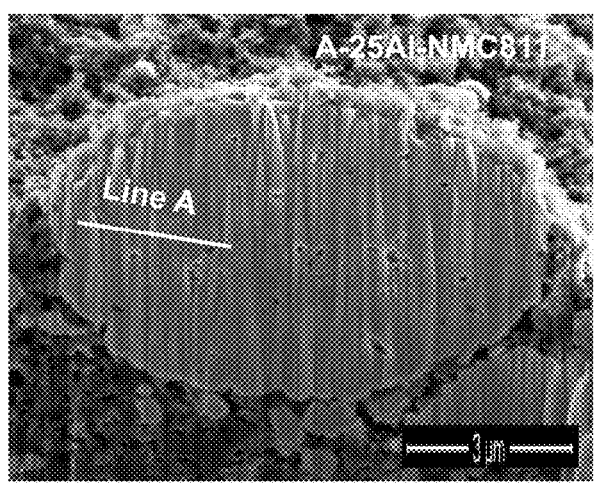
FIG. 1G depicts a cross-sectional SEM image of an A-25Al-NMC811 particle.
Figure 1H:
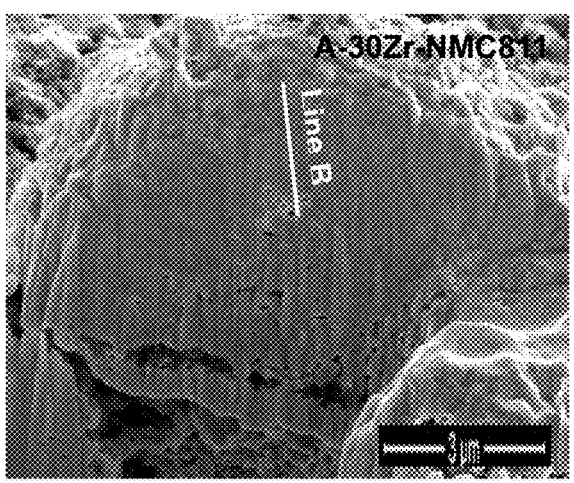
FIG. 1H depicts a cross-sectional SEM image of an A-30Zr-NMC811 particle.
Figure 1I:
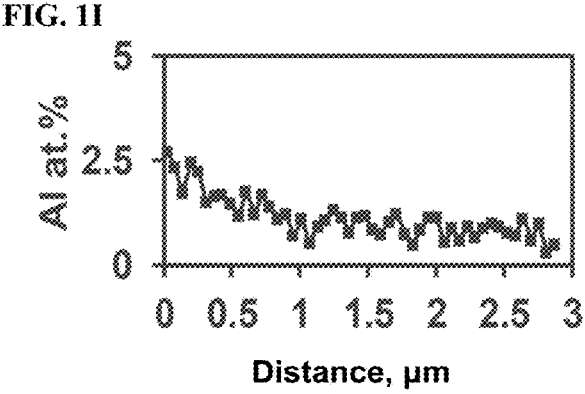
FIG. 1I depicts a line scan corresponding to line A of FIG. 1G.
Figure 1J:
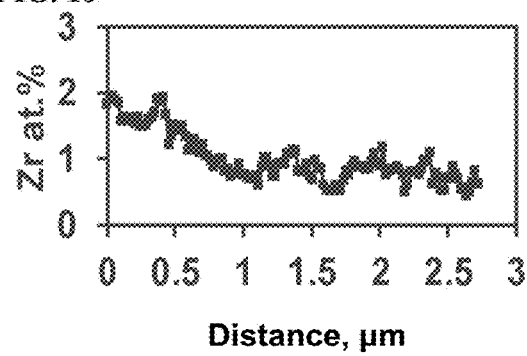
FIG. 1J depicts a line scan corresponding to line B of FIG. 1H.

The effects of Al and Zr modification were first investigated separately before co-modification of Al and Zr. Either Al or Zr was performed as synergetic coating and doping on NMC811 by ALD and followed by post-annealing. In FIG. 1A and FIG. 1B, the TEM images of 25Al-NMC811 and 30Zr-NMC811 show ~3.0 nm of $Al_2O_3$ and ~4.5 nm of $ZrO_2$ conformal coatings along the surface feature of NMC811, respectively. After post-annealing, the coating thicknesses decreased to ~1.0 and ~2.0 nm for A-25-NMC811 and A-30Zr-NMC811 in FIG. 1C and FIG. 1D, respectively, indicating diffusion of Al and Zr into the bulk of NMC811. The lattice d-spacings measured in FIG. 1A and FIG. 1B suggested retention of R-3m layered structure other than inert rocksalt phase after high temperature post-annealing. The result of EDS analysis (FIG. 1E and FIG. 1F) of the circled areas indicated the existence of Al and Zr. SEM-EDS line scans were performed on cross-sectional A-25Al-NMC811 and A-30Zr-NMC811 (FIG. 1G and FIG. 1H), indicating that surface-doping of Al or Zr occurred (FIG. 1J and FIG. 1J). The higher concentration of Al and Zr near the surface was thought to be related to remaining coatings and surface-doping.

Example 3

Figure 2A:
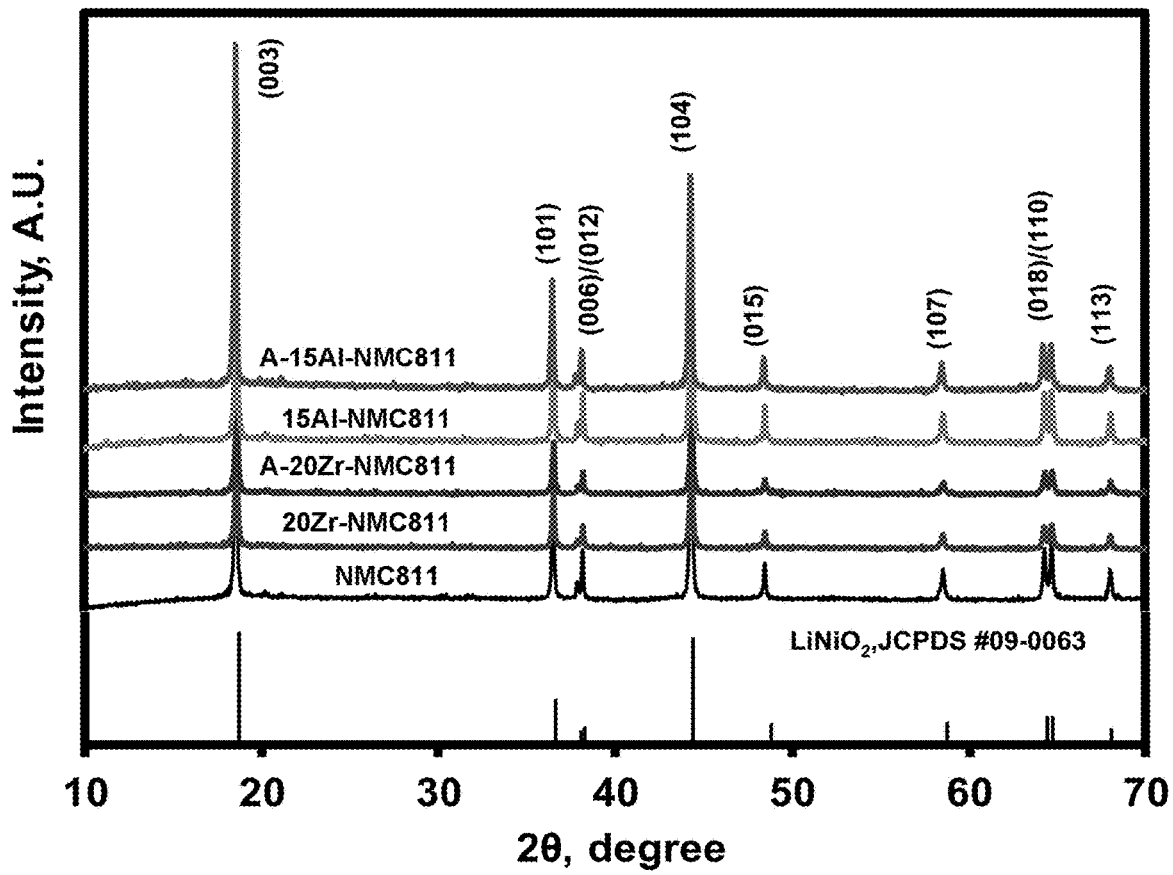
FIG. 2A depicts XRD patterns of NMC811, as-coated and post-annealed 15Al-NMC811, and as-coated and post-annealed 20Zr-NMC811.
Figure 2B:
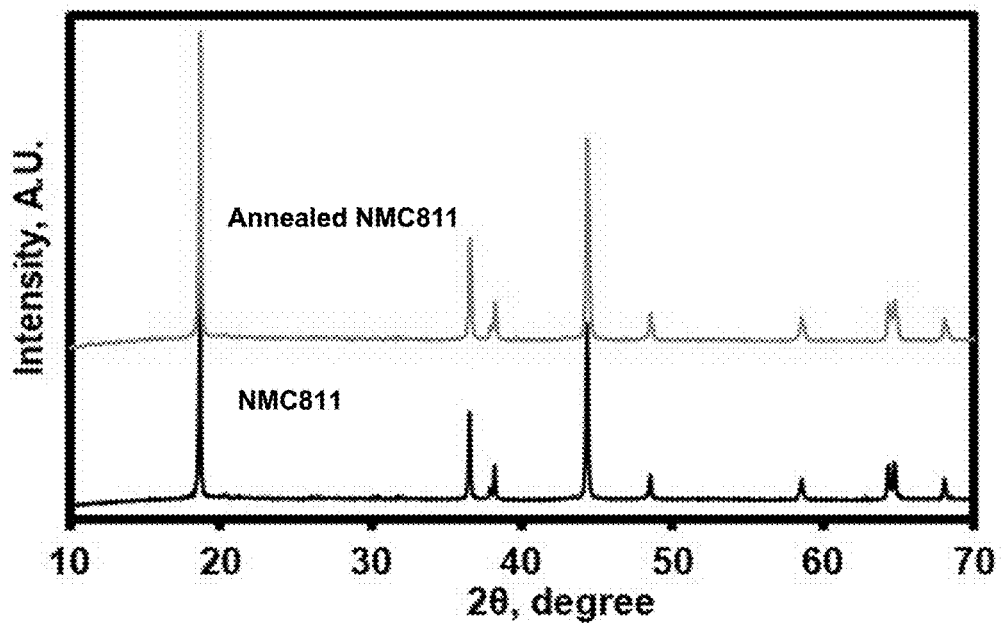
FIG. 2B depicts XRD patterns of pristine and annealed $LiNi_{0.8}Mn_{0.1}Co_{0.1}O_2$ (NMC811).

XRD was used to check whether there was any crystal change for the NMC811 particles after coating or post-annealing. As shown in FIG. 2A, no obvious change was observed for the samples after coating or post-annealing. The samples were well indexed to R-3m layered structure without any secondary phase. In Ni-rich cathodes, cation mixing between Li and Ni may occur, and heavier Ni cations occupying Li sites will cause weaker intensity of (003) peak. The ratios of integrated intensity of (003)/(104) were used to examine cation mixing degree, which were 1.27 for A-15Al-NMC811, 1.23 for A-20Zr-NMC811, and 1.19 for NMC811, 15Al-NMC811, and 20Zr-NMC811, indicating reduced cation mixing of annealed samples. The unit cell volumes were calculated as 101.61 $Å^3$, 101.66 $Å^3$, and 101.63 $Å^3$ for NMC811, A-15Al-NMC811, and A-20Zr-NMC811, respectively. Since $Zr^{4+}$ has a larger ionic radius, the volume expansion of A-20Zr-NMC811 was attributed to Zr doping; in contrast, for A-15Al-NMC811, the ionic radius of $Al^{3+}$ is smaller than those of transition metal cations in NMC811, so the expansion was not due to Al doping, but due to the improved crystallinity or lower Li/Ni cation mixing. In FIG. 2B, the annealed uncoated NMC811 was also characterized by XRD. However, there was no obvious difference between annealed NMC811 and pristine NMC811, and the (003)/(104) ratio of annealed NMC811 was ~1.20, so this indicated that the improved cation ordering of NMC811 was mainly related to cation doping.

Figure 3A:
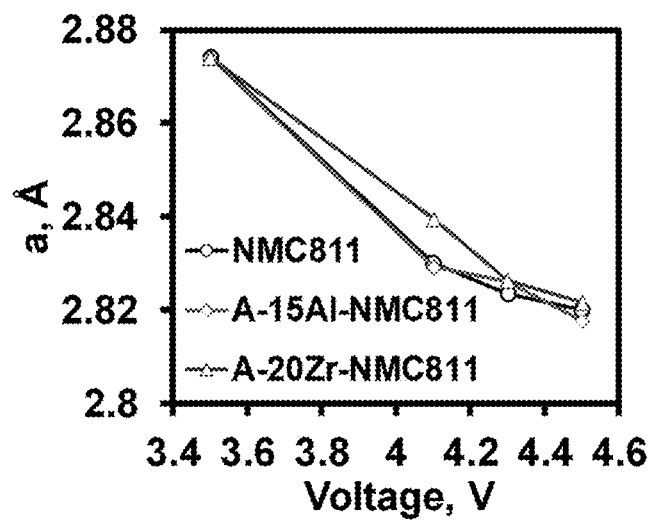
FIG. 3A depicts lattice parameters of a, derived from ex situ XRD patterns of NMC811, A-15Al-NMC811, and A-20Zr-NMC811 after charged to 3.5, 4.1, 4.3, and 4.5 V.
Figure 3B:
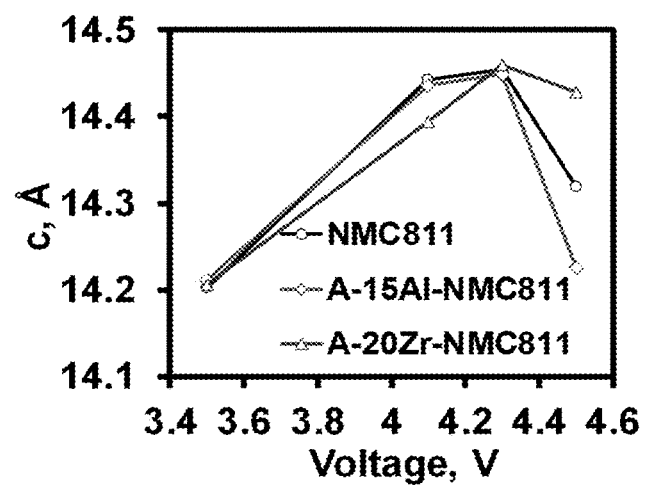
FIG. 3B depicts lattice parameters of c, derived from ex situ XRD patterns of NMC811, A-15Al-NMC811, and A-20Zr-NMC811 after charged to 3.5, 4.1, 4.3, and 4.5 V.
Figure 3C:
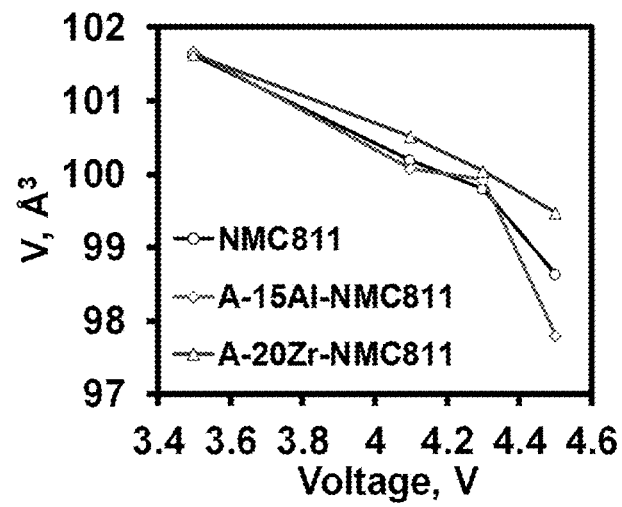
FIG. 3C depicts lattice parameters of volume of unit cell derived from ex situ XRD patterns of NMC811, A-15Al-NMC811, and A-20Zr-NMC811 after charged to 3.5, 4.1, 4.3, and 4.5 V.

An ex situ XRD was performed to investigate the structure change at different delithiated states in FIG. 3A, FIG. 3B, and FIG. 3C. The expansion of volume change after coating and annealing, as shown in FIG. 3A and FIG. 3B, was mainly contributed from the increase of lattice parameter c but not lattice parameter a, and Li mobility in the lattice structure was facilitated by a larger value of c. However, as the Li deintercalated from lattice of NMC811, the volume changes exhibited different manners in FIG. 3A, FIG. 3B, and FIG. 3C. The phase transition during dilithiation of $LiNiO_2$-type cathode experienced H1→M→H2→H3 (H means hexagonal structure, and M means monoclinic); and for high-Ni NMC811, the H2→H3 phase transition tended to induce irreversible structure change and instable electrochemical behavior of the cathode. One obvious phenomenon during H2→H3 transition was significant lattice collapse, which was represented by the significant decrease of lattice parameter c and unit cell volume at 4.3-4.5 V. From the ex situ XRD, the structure of sample particles experienced long relaxation time and led to huge differences at 4.5 V. It is difficult to make the results convergent to an in situ XRD, but the parallel measurements still indicated stabilization of Zr doping to the transition by suppressing this sudden volume change. For Al doped NMC811, the smaller radius of $Al^{3+}$ was attributed to a lower volume than that of NMC811 at 4.5 V. Even though the amount of Al or Zr dopant in NMC811 was estimated to be very low (by comparing the nano-scale coating with micro-scale cathode particle size), it has been reported that even a small amount of dopant can affect the crystal structure of the Ni-rich cathode and cation ordering and mixing during its lithiation/de-lithiation. The lattice collapse was detrimental to structure stability, as the microcracks and detachment formed between grains, and thus caused electrolyte penetration. Therefore, Zr doping should be more preferable in terms of structural stability of NMC811 than Al doping. This is due to a smaller volume change using Zr doping, which was attributed to the larger ionic radius of $Zr^{4+}$ and retention of the cation ordering (Li/Ni) with Zr doping in NMC811, even at the deeply delithiated state.

Example 4

Figure 4A:
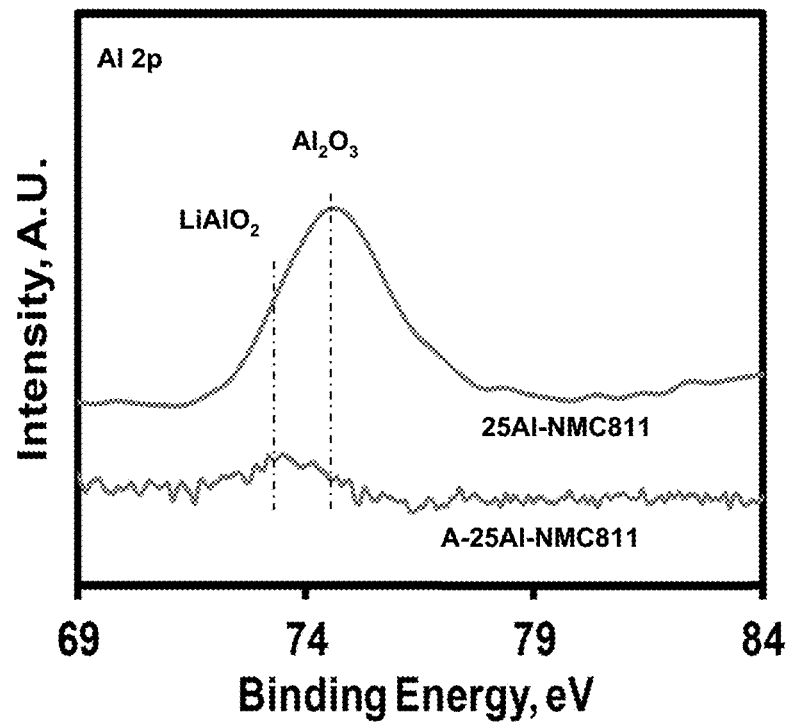
FIG. 4A depicts XPS spectra of as-coated and post-annealed 25Al-NMC811 at Al 2p core level.
Figure 4B:
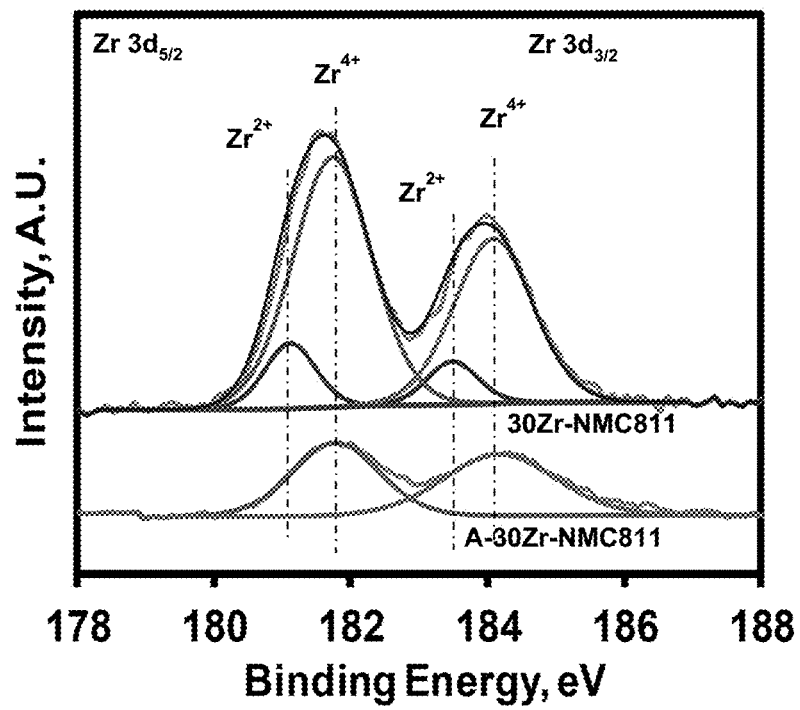
FIG. 4B depicts XPS spectra of as-coated and post-annealed 30Zr-NMC811 at Zr 3d core level.
Figure 4C:
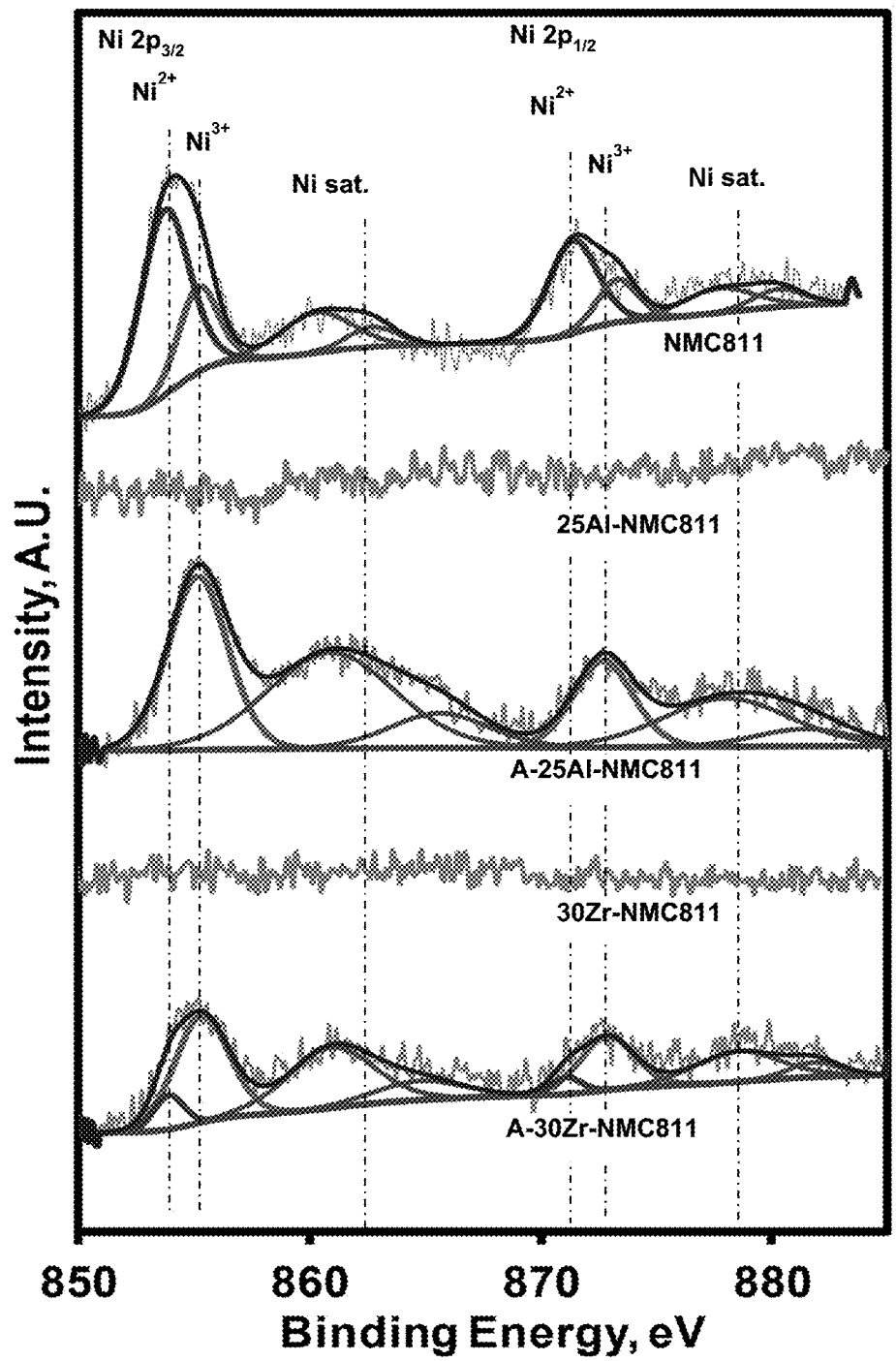
FIG. 4C depicts XPS spectra of the four samples of FIG. 4A and FIG. 4B with NMC811 at Ni 2p core level.
Figure 4D:
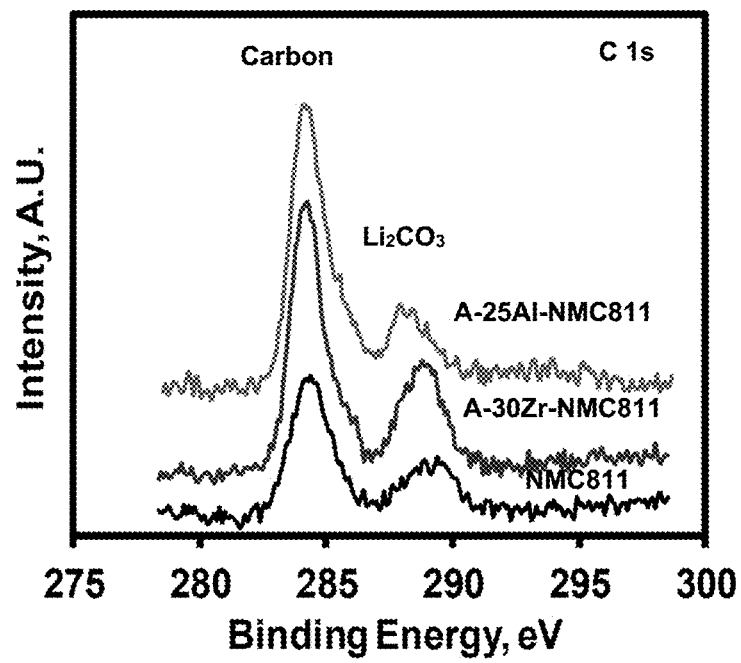
FIG. 4D depicts XPS spectra of pristine NMC811, A-25Al-NMC811, and A-30Zr-NMC81 at C 1s core level.
Figure 4E:
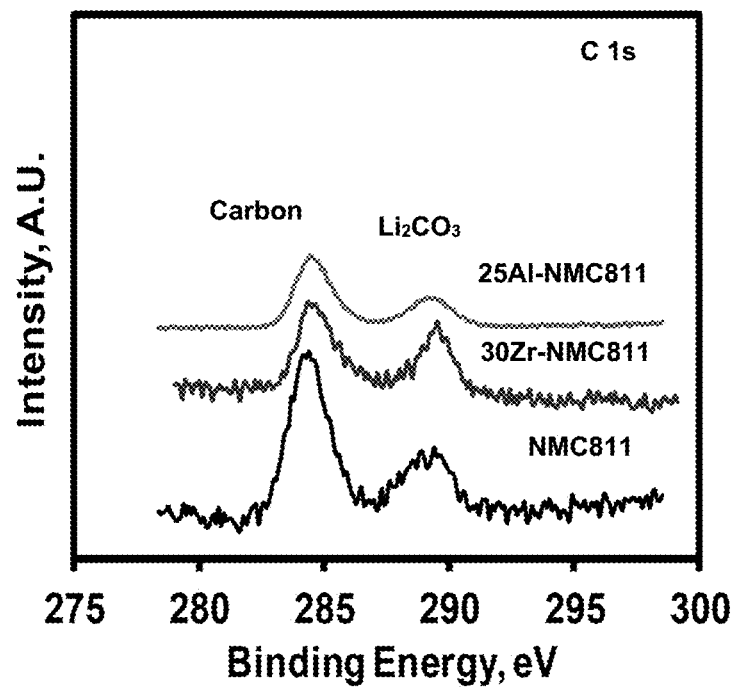
FIG. 4E depicts XPS spectra of pristine NMC811, 25Al-NMC811, and 30Zr-NMC811 at C 1s core level.

According to the TEM images in FIG. 1A-FIG. 1D, thinner layers remained on the surface of the post-annealed coated NMC811 particles, and then the state of the remaining layers was characterized by XPS in FIG. 4A, FIG. 4B, and FIG. 4C. For the A-25Al-NMC811 in FIG. 4A, the peak at ~74.2 eV corresponded to $Al_2O_3$ ALD coating, which shifted to a lower binding energy, and ~73.4 eV indicated a partial conversion from $Al_2O_3$ to $LiAlO_2$. It is worth noting that the ultrathin $LiAlO_2$ or combination of $Al_2O_3/LiAlO_2$ coating was reported to be superior, as compared to the sole $Al_2O_3$ coating due to enhanced Li transport properties. In FIG. 4B, there was no obvious evolution of $ZrO_2$ coating except for oxidation from $Zr^{2+}$ to $Zr^{4+}$, indicating that the surface coating for A-30Zr-NMC811 should be $Li_2ZrO_3$ or $ZrO_2$ coatings. NMC811 tended to lose oxygen during high temperature annealing and formed inert rocksalt phase and $Li_2CO_3$ compound on the surface. In FIG. 4D and FIG. 4E, the C 1s core level in the XPS spectra indicated the formation of $Li_2CO_3$ (peaks at ~289 eV), but it was at a low amount for each sample even after annealing at 750° C., especially for A-25Al-NMC811, which was attributed to the formation of Li-contained $LiAlO_2$ or $Li_2ZrO_3$. The other impact of post-annealing should be change of Ni valence on the surface of NMC811. For the 25 Al- and 30Zr-NMC811, the relatively thick coatings blocked the Ni signal due to the fact that the sensitivity of XPS is only a few nanometers, and so no obvious Ni intensity was observed. After annealing, the Ni peaks appeared, indicating the diffusion of Al or Zr into the lattice of NMC811, corresponding to decrease of Al and Zr intensities and reduction of thicknesses of those surface coatings. The Li-contained $LiAlO_2$ or $Li_2ZrO_2$ coating should benefit $Li^+$ hopping in the surface coating layers. Meanwhile, it was observed that the amount of $Ni^{2+}$ notably decreased for A-25Al-NMC811 and A-30Zr-NMC811. $Ni^{2+}$ is commonly formed due to oxygen loss and accompanied with an inert rocksalt phase, while the valence of $Ni^{3+}$ is desirable for a Ni-rich layered cathode, since $Ni^{3+}$ is electrochemically active as compared with $Ni^{2+}$.

Example 5

Figure 5A:
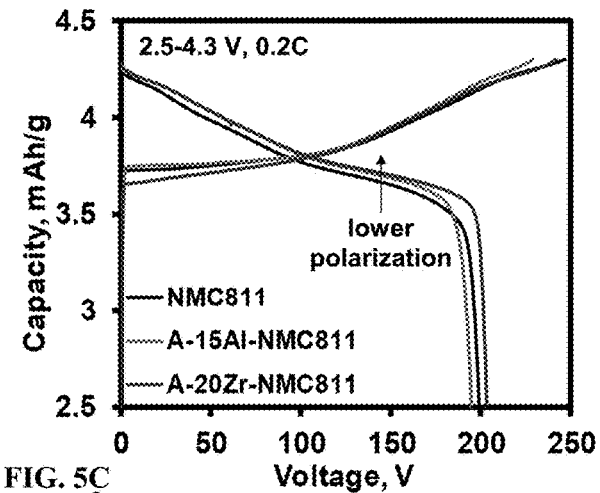
FIG. 5A depicts voltage profiles of NMC811, A-15Al-NMC811, and A-20Zr-NMC811 during the 1$^{st}$ cycle of charge/discharge.
Figure 5B:
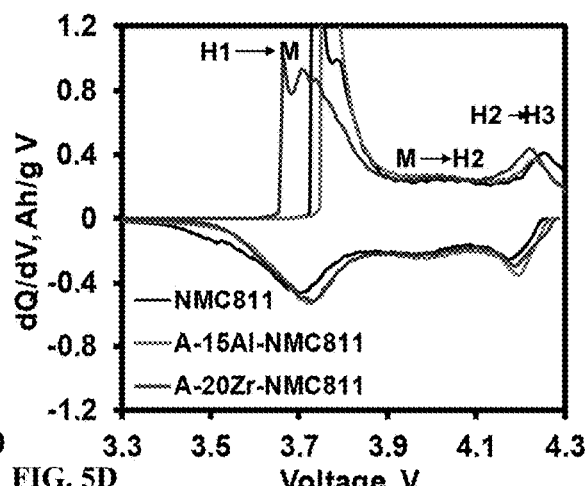
FIG. 5B depicts differential capacities of NMC811, A-15Al-NMC811, and A-20Zr-NMC811 during the 1$^{st}$ cycle of charge/discharge.
Figure 5C:
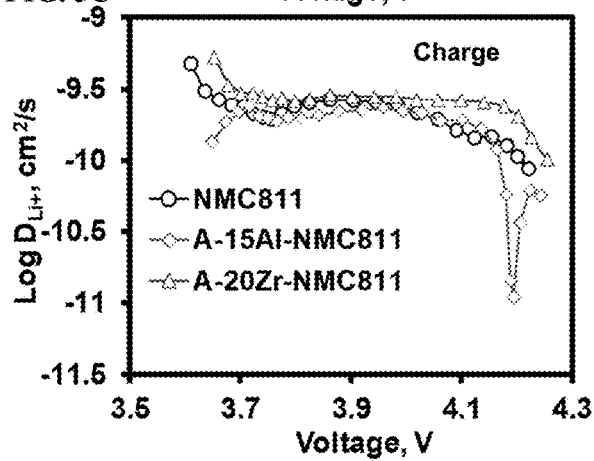
FIG. 5C depicts Li$^+$ diffusion coefficients derived from GITT during the 1$^{st}$ charge.
Figure 5D:
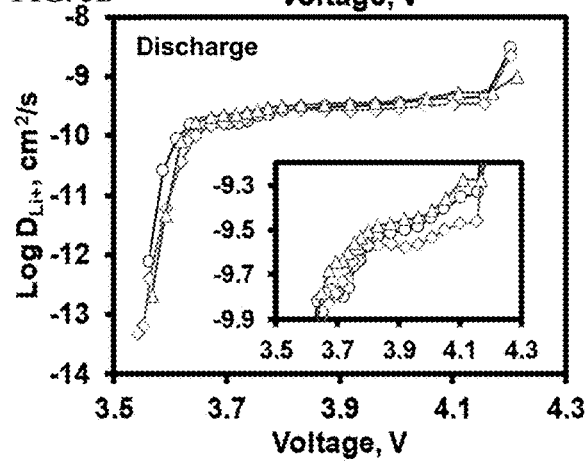
FIG. 5D depicts Li$^+$ diffusion coefficients derived from GITT during the 1$^{st}$ discharge.
Figure 5E:
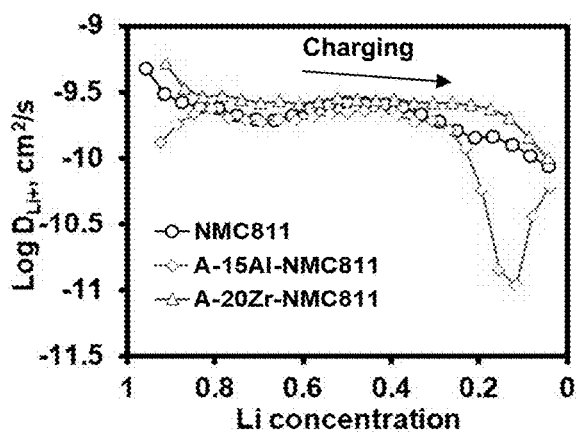
FIG. 5E depicts Li$^+$ diffusion coefficients vs. Li concentration in NMC811 derived from GITT during the 1$^{st}$ charge, and the arrow indicates proceeding direction of charging.
Figure 5F:
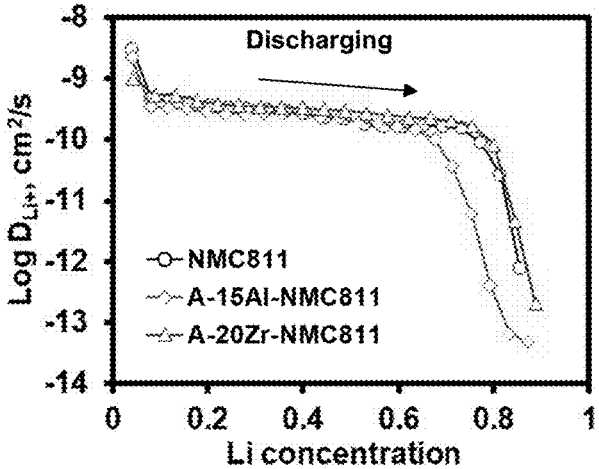
FIG. 5F depicts Li$^+$ diffusion coefficients vs. Li concentration in NMC811 derived from GITT during the 1$^{st}$ discharge, and the arrow indicates proceeding direction of discharging.

The facile $Li^+$ transport was first examined during the initial charge/discharge cycle in FIG. 5A. The specific capacity that each sample delivered was 199, 195, and 203 mAh/g for NMC811, A-15Al-NMC811, and A-20Zr-NMC811, respectively, and the coulombic efficiencies were 80.7%, 85.4%, and 84.1%, respectively. The modified samples exhibited a lower polarization, which was interpreted from higher voltage profiles during discharge in FIG. 5A as noted. In FIG. 5B, the corresponding differential capacities were derived from profiles in FIG. 5A, where H1→M→H2→H3 phase transition was represented by the two pairs of peaks and diminished peak area. It was reported that H1→M→H2 remained stable during lithiation/de-lithiation of Ni-rich LIB cathode; during H2→H3 transition, lattice shrunk, active $Ni^{4+}$ formed, and the structure became unstable. Since the detrimental evolution of structure induces lift-up of internal resistance that is reflected on polarization, the peaks of H2→H3 during charge/discharge were examined, which were 73.5, 45.3, and 32.3 mV for NMC811, A-15Al-NMC811, and A-20Zr-NMC811, respectively. The higher value indicated larger polarization and more internal resistance during this transition. $Li^+$ diffusion coefficient was estimated through GITT in FIG. 5C and FIG. 5D. The results showed similar diffusion coefficients at H1→M→H2 transition, but an obvious deviation occurred at H2→H3 transition, where coefficients of A-20Zr-NMC811 and A-15Al-NMC811 distinctively changed. As described in the XRD patterns in FIG. 2A, the change was expected due to a significant shrinkage of lattice of A-15Al-NMC811 at a highly delithiated state, and A-20Zr-NMC811 had the least change thus a better $Li^+$ transport. The controversial results between voltage profiles and GITT should be related to differences of test conditions, which were continuous Li lithiation/de-lithiation for galvanostatic charge/discharge and intermittent charge/discharge with rest for equilibrium for GITT. Different plots ($D_{Li+}$ vs. Li concentration in NMC811) of FIG. 5C and FIG. 5D are shown in FIG. 5E and FIG. 5F, respectively. The two different plots show similar trends for the three samples, and compared with the plots of $D_{Li+}$ vs. voltage, A-15Al-NMC811 exhibited a worse $Li^+$ transport at a highly lithiated state during discharge, indicating certain negative effects of Al doping to NMC811.

Example 6

A cyclic test was then performed to depict the impact of modification by Al and Zr. In FIG. 6A, FIG. 6B, FIG. 6C, and FIG. 6D, the cyclic performance and voltage hysteresis involved optimization among different coating thicknesses for $Al_2O_3$ and $ZrO_2$ coatings. To investigate charge/discharge at higher upper cutoff voltage for NMC811, the voltage range was expanded to 2.5-4.5 V, which provided ~10% higher capacity than that at 2.5-4.3 V, but the degradation was more severe. The samples coated with 15 cycles of $Al_2O_3$ ALD and 20 cycles of $ZrO_2$ ALD, followed by heat treatment, delivered higher specific capacities, i.e., 195 and 203 mAh/g for A-15Al-NMC811 and A-20Zr-NMC811, respectively, which were slightly lower than 206 mAh/g of NMC811. The capacity retentions of A-15Al-NMC811 and A-20Zr-NMC811 were 79.2% and 75.3% after 200 cycles of charge/discharge, respectively, higher than 51.1% of NMC811. The voltage hysteresis was calculated from differences of power-weighted average voltage (energy divided by capacity) between charge and discharge for each cycle. These results can be used to illustrate evolution of polarization during repeating charge/discharge of coin cells. The increase rate of NMC811, and A-15Al-NMC811, and A-20Zr-NMC811 were 2.35, 0.94, and 1.44 mV/cycle, respectively, suggesting a lower rate of internal resistance increase of NMC811 modified by $Al_2O_3$ ALD coating followed by annealing. However, during the early stage of cycling, the internal resistance of A-20Zr-NMC811 should be lower, therefore, its better retention of capacity than that of A-15Al-NMC811 was observed, as shown in FIG. 6E and FIG. 6F, which were 96 and 79 mAh/g at a 5C rate for A-20Zr-NMC811 and A-15Al-NMC811, respectively.

Figure 8A:
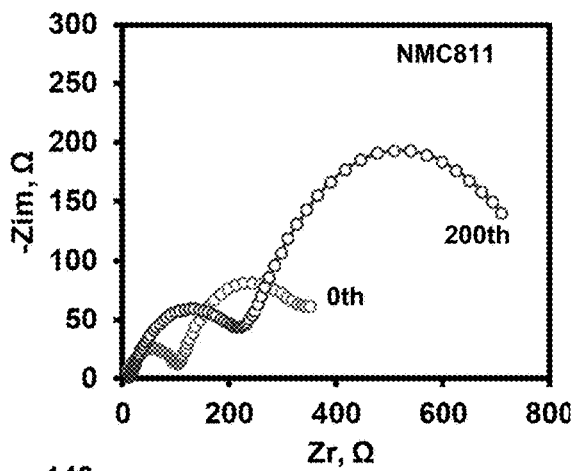
FIG. 8A depicts EIS measurements of NMC811 at 0$^{th}$ and 200$^{th}$ cycles.
Figure 8B:
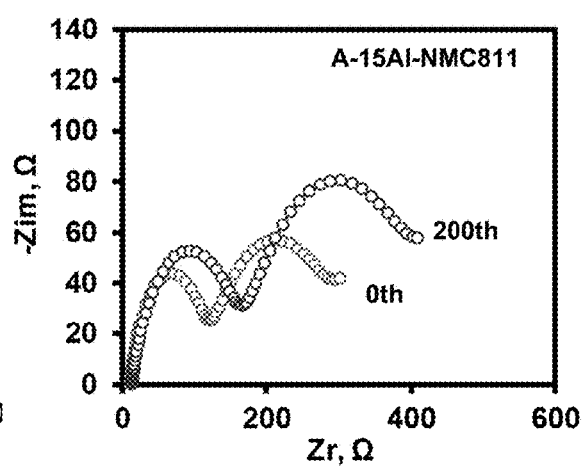
FIG. 8B depicts EIS measurements of A-15Al-NMC811 at 0$^{th}$ and 200$^{th}$ cycles.
Figure 8C:
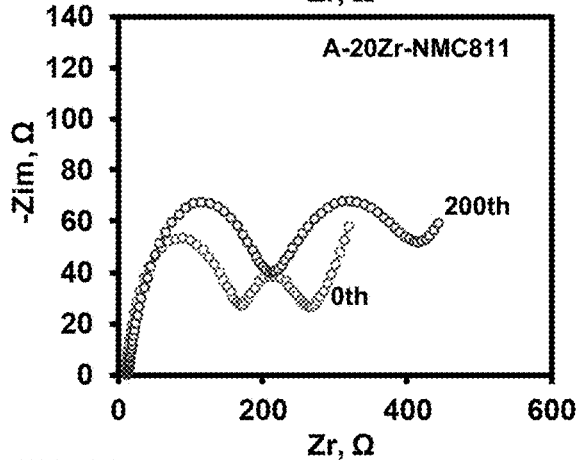
FIG. 8C depicts EIS measurements of A-20Zr-NMC811 at 0$^{th}$ and 200$^{th}$ cycles.

For the sample with a thicker coating of 25 cycles of $Al_2O_3$ ALD followed by annealing (i.e., A-25Al-NMC811), it may be more complicated than the situation with only coatings. Diffusion of Al from $Al_2O_3$ coating to Ni-rich LIB cathode has been investigated, and it has been found that excess amount of Al would jeopardize the performance of NMC811, as Al could easily diffuse into the bulk of NMC811 and substitute $Li^+$ to lower the performance of the cathode. Therefore, A-25Al-NMC811 did not show as good a performance as A-15Al-NMC811. As for A-10Al-NMC811, insufficient Al loading of A-25Al-NMC811 cannot help form $LiAlO_2$, and thus lead to a worse cyclic stability. A proper amount of Al can act as a placeholder at Li site to suppress cation mixing at delithiated state of NMC811; in the meanwhile, it will form Li-conductive $LiAlO_2$ coating on the surface. As for A-Zr-NMC811, the inter-substitution occurred between Ni and Zr, which can improve cation ordering in the transition metal slabs. Therefore, it is not a concern that dopants obstruct Li diffusion. However, the cyclic results exhibited a lower capacity retention of A-20Zr-NMC811 than that of A-15Al-NMC811, and the voltage hysteresis also showed a faster increase for A-20Zr-NMC811. In FIG. 6G and FIG. 6H, 4Al-NMC811 and 5Zr-NMC811 (with coatings only, but without heat treatment) were tested, and the loss of initial specific capacity was marginal for 4-Al-NMC811, but the capacity retention was better than 5Zr-NMC811. One possible reason for this was the improvement of surface stability by chemistry between electrolyte and $Al_2O_3$ coated cathode; another possible reason is related to the formation of Li compound (mainly $Li_2CO_3$) during $ZrO_2$ ALD, as shown in FIG. 4D and FIG. 4E, due to vacuum, moisture, and relatively high temperature in the ALD process. As shown in FIG. 8A-FIG. 8C, EIS was also performed to measure the internal resistances of NMC811, A-15Al-NMC811, and A-20Zr-NMC811, with the total resistance of $R_f$ and $R_{ct}$ corresponding to the results of hysteresis.

Example 7

Figure 6A:
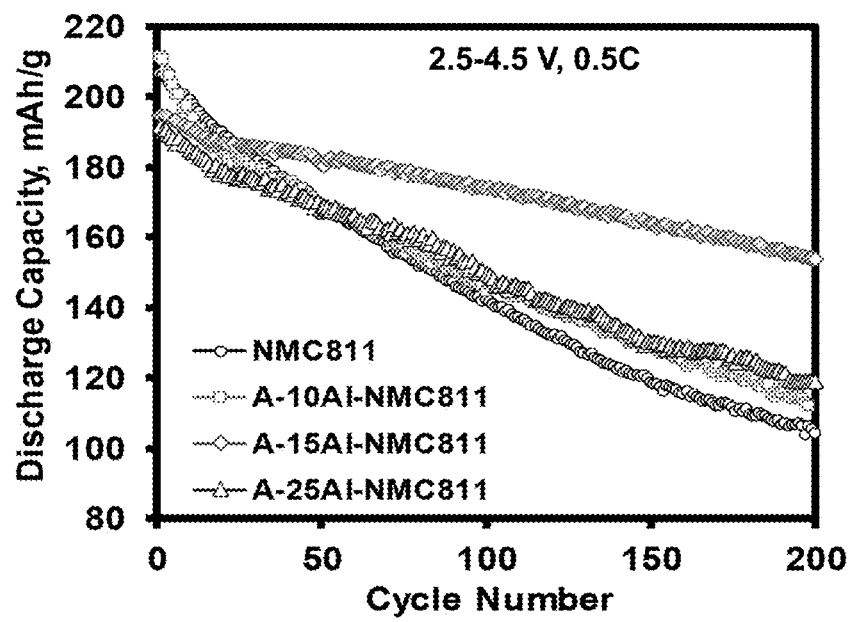
FIG. 6A depicts cyclic tests of pristine NMC811 and A-10/15/25Al-NMC811 at a 0.5C rate.
Figure 6B:
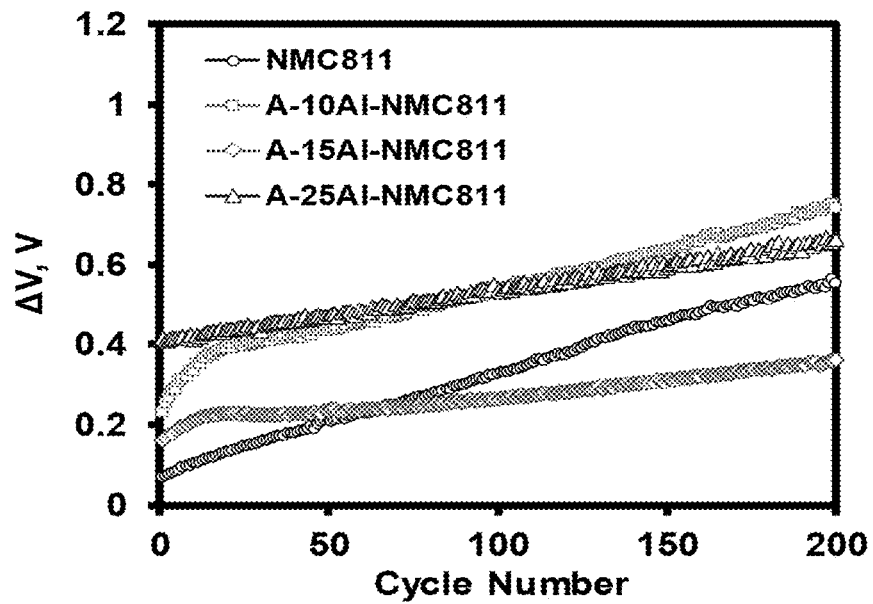
FIG. 6B depicts voltage hysteresis of pristine NMC811 and A-10/15/25 Al-NMC811 at a 0.5C rate.
Figure 6C:
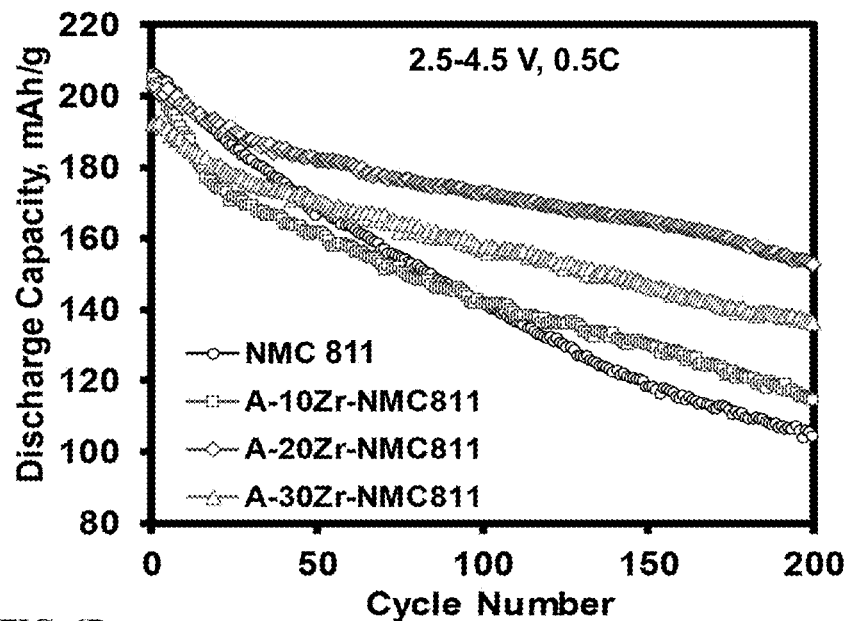
FIG. 6C depicts cyclic tests of pristine NMC811 and A-10/20/30Zr-NMC811 at a 0.5C rate.
Figure 6D:
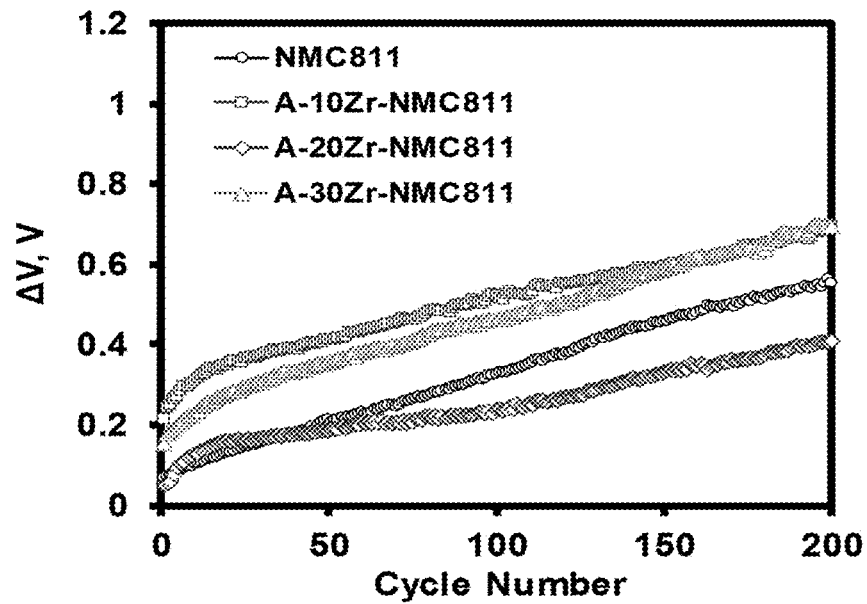
FIG. 6D depicts voltage hysteresis of pristine NMC811 and A-10/20/30Zr-NMC811 at a 0.5C rate.
Figure 6E:
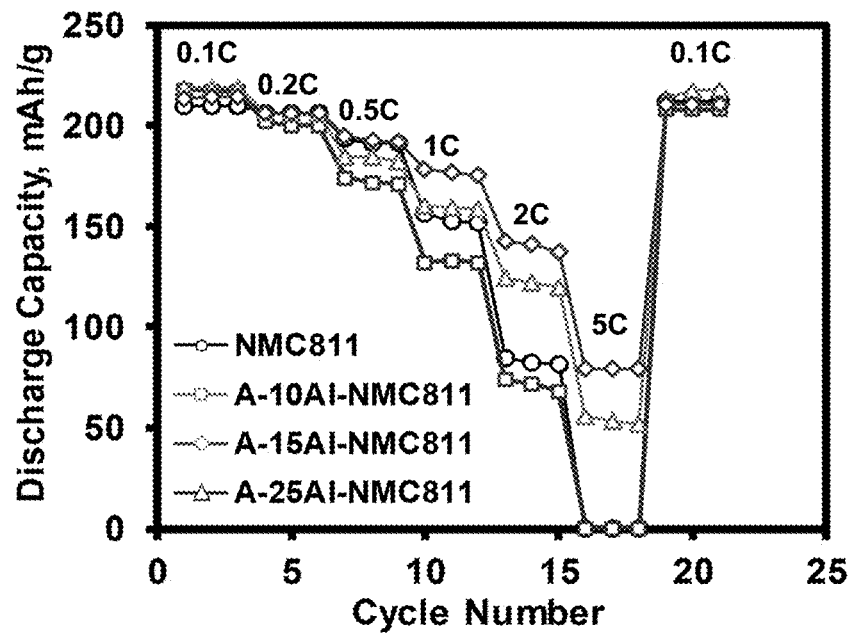
FIG. 6E depicts electrochemical tests of pristine NMC811 and A-10/15/25Al-NMC811 at different C rates (0.1C, 0.2C, 0.5C, 1C, 2C, and 5C). The voltage range was 2.5-4.5 V for these tests.
Figure 6F:
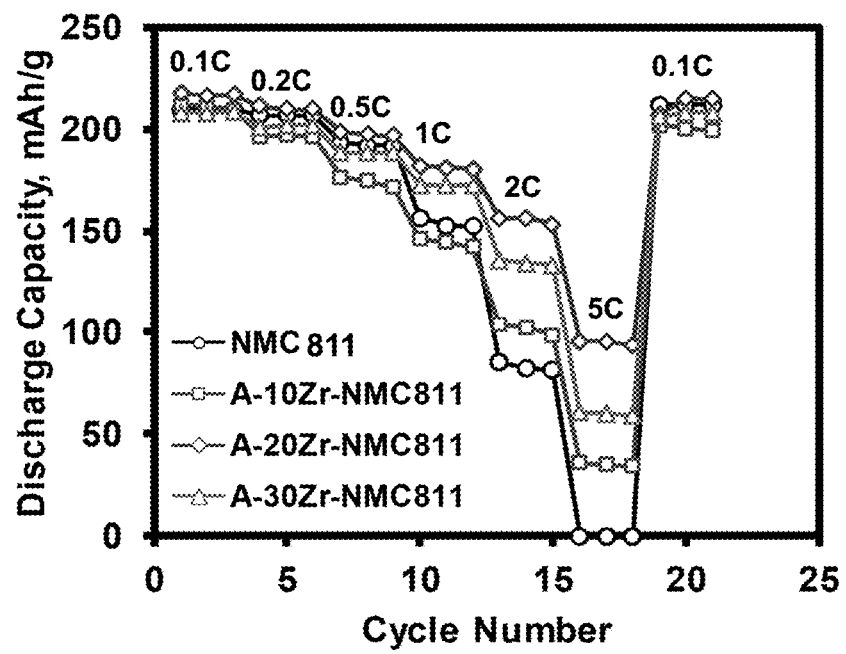
FIG. 6F depicts electrochemical tests of pristine NMC811 and A-10/20/30Zr-NMC811 at different C rates (0.1C, 0.2C, 0.5C, 1C, 2C, and 5C). The voltage range was 2.5-4.5 V for these tests.
Figure 6G:
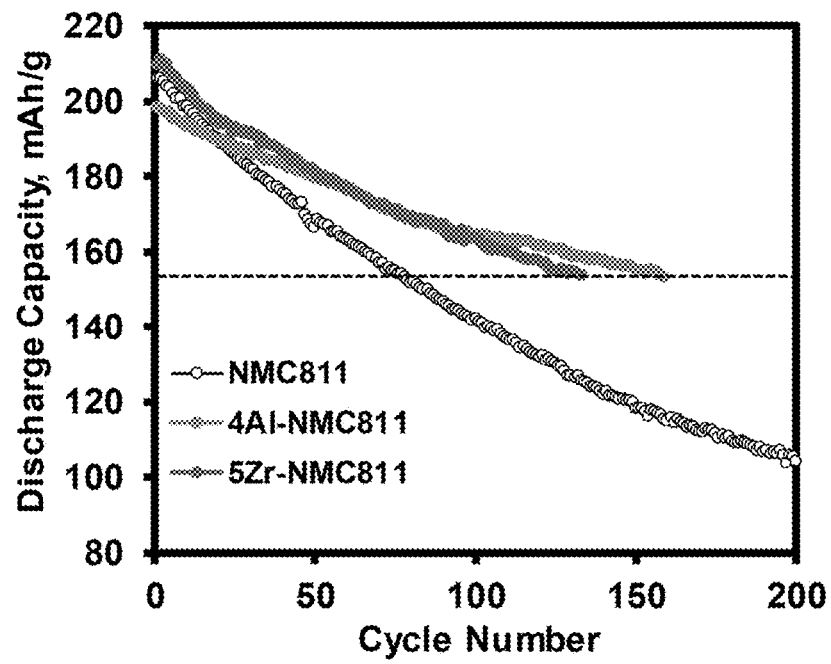
FIG. 6G depicts cyclic tests of pristine NMC811, 4Al-NMC811, and 5Zr-NMC811 at a 0.5C rate in a voltage range of 2.5-4.5 V.
Figure 6H:
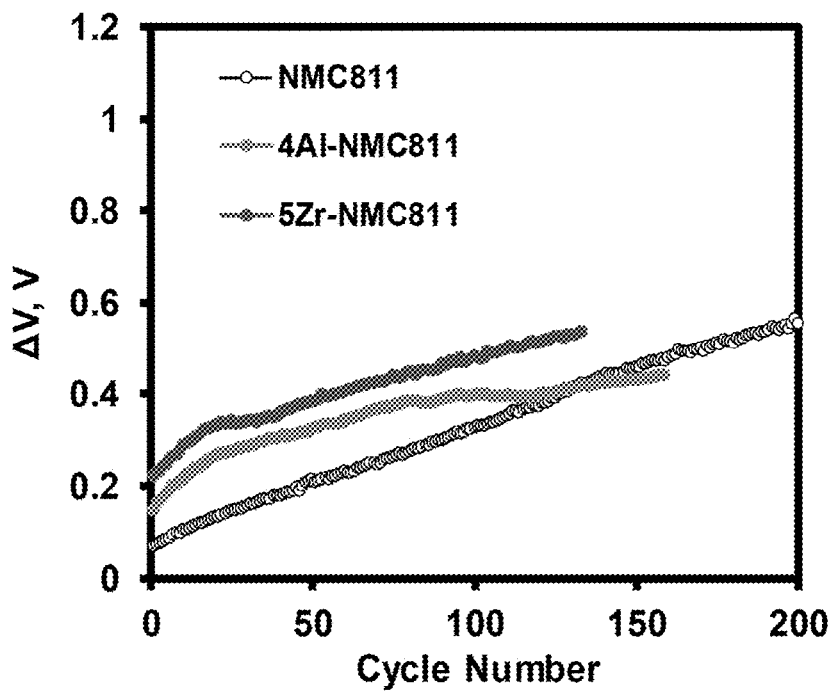
FIG. 6H depicts voltage hysteresis of pristine NMC811, 4Al-NMC811, and 5Zr-NMC811 at a 0.5C rate in a voltage range of 2.5-4.5 V.
Figure 7A:
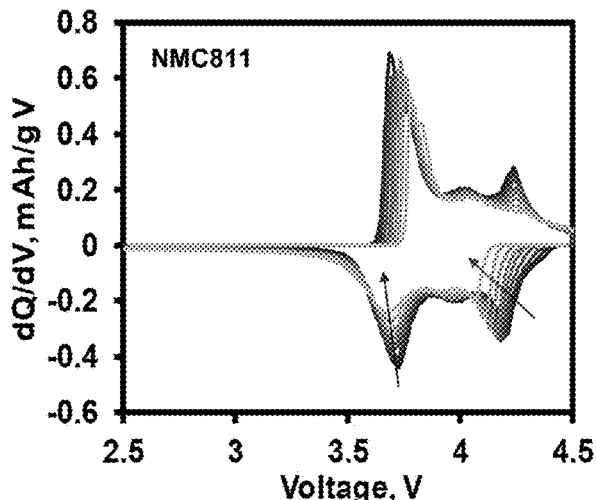
FIG. 7A depicts differential capacities of NMC811 corresponding to cyclic tests in FIG. 6A and FIG. 6C for initial 100 cycles of charge/discharge.
Figure 7B:
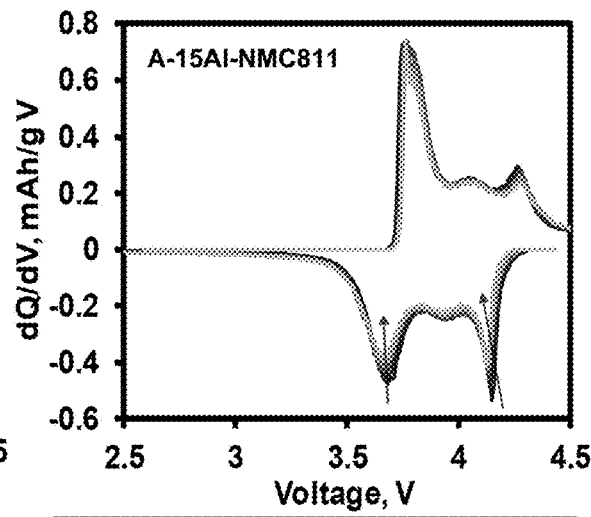
FIG. 7B depicts differential capacities of A-15Al-NMC811 corresponding to cyclic tests in FIG. 6A for initial 100 cycles of charge/discharge.
Figure 7C:
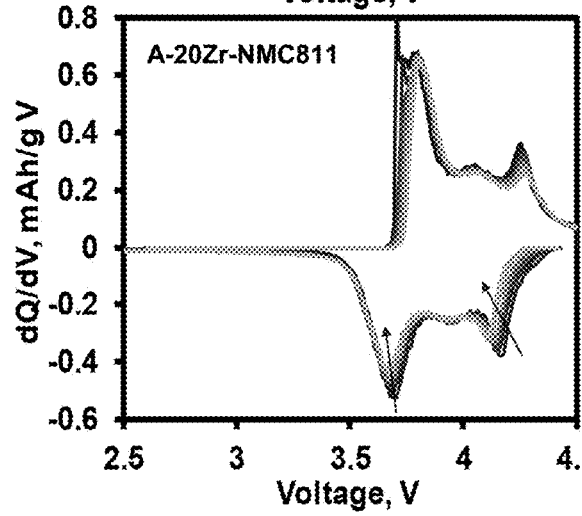
FIG. 7C depicts differential capacities of A-20Zr-NMC811 corresponding to cyclic tests in FIG. 6C for initial 100 cycles of charge/discharge.
Figure 7D:
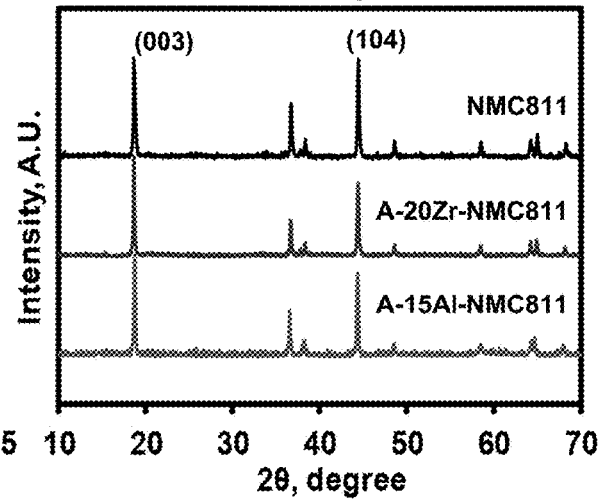
FIG. 7D depicts XRD patterns of cycled cathodes after 200 cycles of charge/discharge.

For the initial 100 cycles of charge/discharge in FIG. 6A and FIG. 6C, the capacities were differentiated in FIG. 7A, FIG. 7B, and FIG. 7C. Capacity fading is commonly related to the formation of rocksalt phase, cation mixing, and increase of internal resistance for NMC811 cathode. The arrows pointed out differential capacities from the $1^{st}$ to the $100^{th}$ cycle, and each two arrows corresponded to degradation during H1→M and H2→H3 phase transition. The significant decrease in intensity and shift for NMC811 was due to Li/Ni cation mixing and the formation of a rocksalt phase. This accounted for capacity degradation of NMC811 shown previously. In FIG. 7D, ratios of integrated intensities of (003)/(104) peaks were 1.08, 1.10, 1.14 for NMC811, A-15Al- and A-20Zr-NMC811, respectively, which proved that Li/Ni cation mixing for NMC811 was more severe due to a lower ratio, and Zr-doping was helpful to keep cation ordering in the Li and transition metal slabs. In addition, it was noted that Al doping exaggerated phase transition of H2→H3 for the high intensity at ~4.2 V, which was possibly due to the surface aggregation of Co with Al and partial formation of $LiNi_xCo_yAl_{1-x-y}O_2$ phase. The negative effects of structure change during cycling were then reflected on charge transfer resistance that were measured using EIS.

Example 8

Figure 8D:
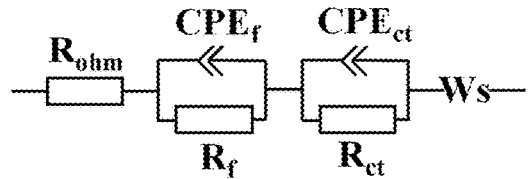
FIG. 8D depicts the fitting model used for the Nyquist plots.

EIS was performed before and after the cyclic tests of coin cells. As shown in FIG. 8A, FIG. 8B, and FIG. 8C, the Nyquist plots show ohmic resistance at intercept with x-axis, film resistance for the first semicircle on the left, and charge-transfer resistance for second semicircle on the right. The model in FIG. 8D was used to fit each curve and to acquire parameters of $R_f$ (film resistance) and $R_{ct}$ (charge-transfer resistance) in Table 1. For NMC811, both $R_f$ and $R_{ct}$ exhibited a severe increase. The increase of $R_f$ was due to thickening of solid permeable interface (SPI) layer on the surface of cathode, and the increase of $R_{ct}$ was thought to be related to its instable structure. The variations between A-15Al-NMC811 and A-20Zr-NMC811 were correlated to analysis above: the lower $R_f$ of A-15Al-NMC811 indicated the Al benefit for the surface chemistry, and the lower $R_{ct}$ of A-20Zr-NMC811 suggested Zr doping is superior for suppression of structure degradation.

TABLE 1

Fitting results derived from FIG. 8A-FIG. 8C

| Samples | Cycle Number | $R_f/\Omega$ | $R_{ct}/\Omega$ |
| --- | --- | --- | --- |
| NMC811 | 0 | 101 | 224 |
|  | 200 | 222 | 510 |
| A-15Al-NMC811 | 0 | 110 | 168 |
|  | 200 | 152 | 231 |
| A-20Zr-NMC811 | 0 | 141 | 113 |
|  | 200 | 195 | 198 |

Example 9

Figure 10A:
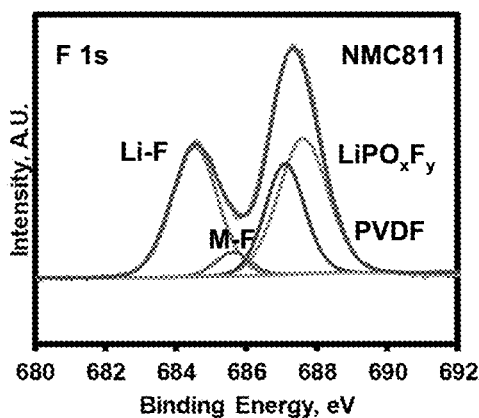
FIG. 10A depicts XPS spectra of cycled NMC811 cathodes at F 1s core level.
Figure 10B:
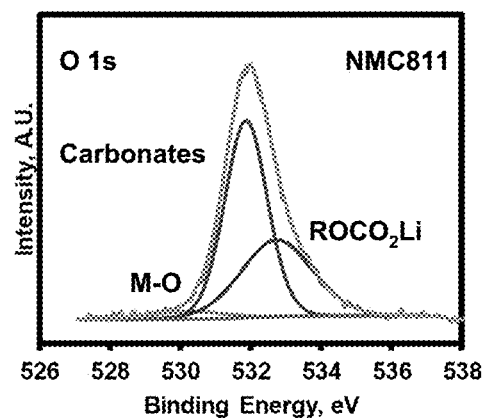
FIG. 10B depicts XPS spectra of cycled NMC811 cathodes at O 1s core level.
Figure 10C:
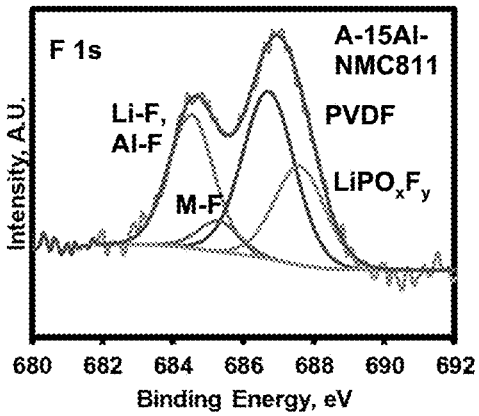
FIG. 10C depicts XPS spectra of cycled A-15Al-NMC811 cathodes at F 1s core level.
Figure 10D:
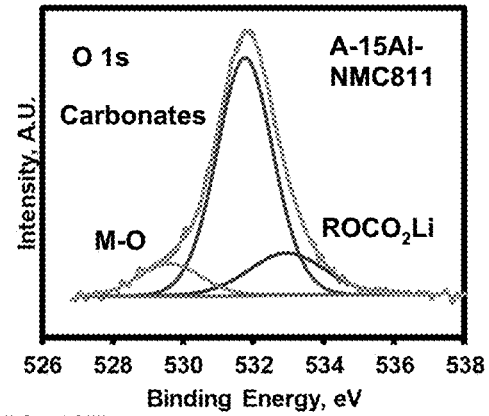
FIG. 10D depicts XPS spectra of cycled A-15Al-NMC811 cathodes at O 1s core level.
Figure 10E:
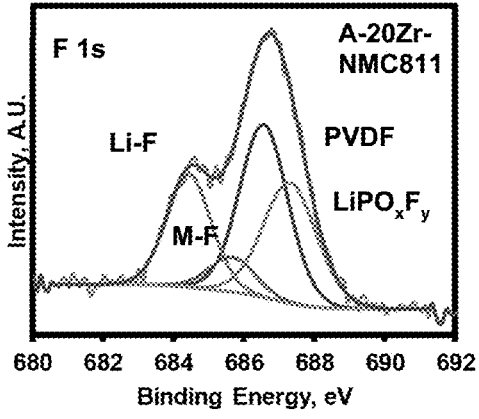
FIG. 10E depicts XPS spectra of cycled A-20Zr-NMC811 cathodes at F 1s core level.
Figure 10F:
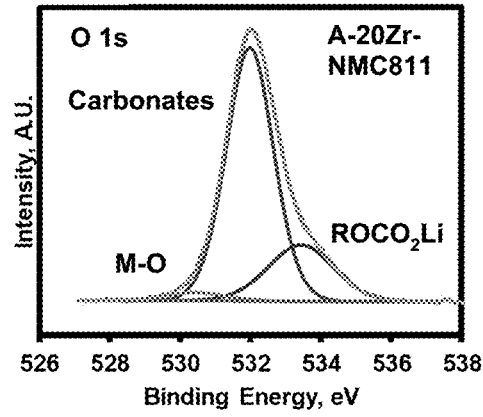
FIG. 10F depicts XPS spectra of cycled A-20Zr-NMC811 cathodes at O 1s core level.

SEM was used to study the cycled cathodes after 200 cycles of charge/discharge. The cracks were observed for the cycled spherical NMC811 particles and marked by red circles and arrows in FIG. 9A and FIG. 9B. The structure instability caused by H2→H3 transition leads to pulse of lattice shrinkage/expansion during repeating cycling, and finally was reflected on the cracks of cycled NMC811 particles. The cracks increased internal resistance of grain boundaries and led to infusion of electrolytes into the particles. As for A-15Al-NMC811 and A-20Zr-NMC811, most particles remained as their spherical shapes, and a limited number of cracks were observed in FIG. 9C, FIG. 9D, FIG. 9E, and FIG. 9F. In the magnified SEM images, the grains of A-15Al-NMC811 particles were observed due to suppressed growth of SPI layer in FIG. 9D, and the rough surface of A-A20Zr-NMC811 particles in FIG. 9F were attributed to thicker SPI layer than that of A-15Al-NMC811, but the polymer-like surface and detachment of grains in FIG. 9B indicated severe degradation of surface and structure of unmodified NMC811. Even though Al doping aggravated lattice shrinkage as found by ex situ XRD, the less cracking of A-15Al-NMC811 than that of pristine NMC811 indicated the lattice collapse was not the only reason for degradation of NMC811, since it was also shown that $Al_2O_3$ coating can benefit cyclic stability (4Al-NMC811 vs. 5Zr-NMC811 in FIG. 6G and FIG. 6H). Next, the XPS spectra were measured and deconvolved after cycling of these cathodes. The F 1s of NMC811 (FIG. 10A) shows stronger peaks of Li—F and $LiPO_xF_y$ than those of A-15Al-NMC811 (FIG. 10C) and A-20Zr-NMC811 (FIG. 10E) due to more severe decomposition of electrolyte species and parasitic reactions between NMC811 surface and electrolyte. As for O 1s core level (FIG. 10B, FIG. 10D, and FIG. 10F), the A-15Al-NMC811 sample exhibited stronger peak M-O and weaker peak of $ROCC_2Li$ indicating the suppressed growth of SPI layer due to Al surface modification. Therefore, the XPS results were consistent with this analysis.

The Al and Zr modification on NMC811 were investigated on the properties of surface film, lattice structure, electrochemical performance, and post-test analysis. The $Al_2O_3$ or $Al_2O_3/LiAlO_2$ coating of Al modification benefited the surface stability of NMC811, due to suppressed side reactions and continuous growth of the SPI layer, but the Al-doping by ALD plus post-annealing aggravated lattice collapse and, thus, resulted in a lower capacity. By adopting Zr doping instead, lattice collapse was alleviated, and Zr cations supported the structure during intercalation/de-intercalation of $Li^+$ and, meanwhile, the slight expansion of the lattice structure due to Zr doping also favored $Li^+$ transport properties in the bulk structure. Commonly, in a NCA cathode, Al dopant is added during synthesis in order to stabilize the structure of the Ni-rich cathode and improve cyclic stability, but it should be noted that this doping during synthesis in a NCA cathode differs from doping achieved by annealing of coating film in this work due to variations of structures and bulk local ordering in the cathode, so Al dopant exhibited a negative function in this work.

Figure 11A:
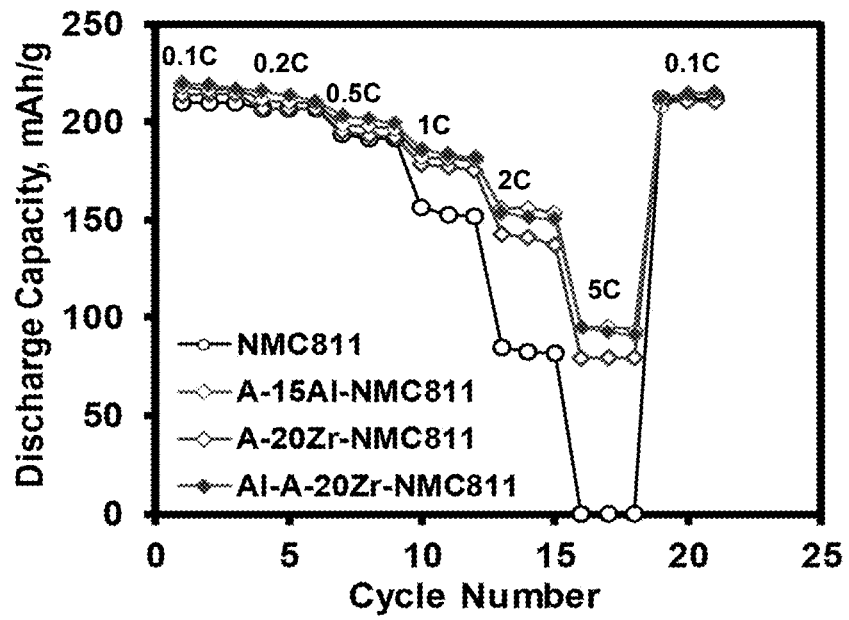
FIG. 11A depicts cyclic tests of 4 cycles of Al$_2$O$_3$-coated A-20Zr-NMC811 (Al-A-20Zr-NMC811) at different C rates (0.1, 0.2, 0.5, 1, 2, and 5C, 3 cycles for each C rate). The voltage range was 2.5-4.5 V.
Figure 11B:
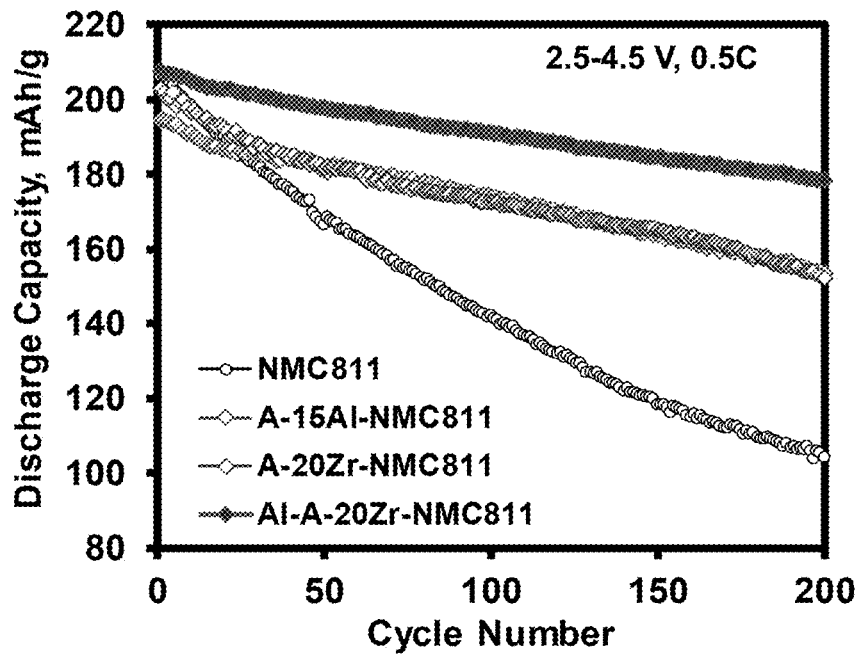
FIG. 11B depicts cyclic tests of 4 cycles of Al$_2$O$_3$-coated A-20Zr-NMC811 (Al-A-20Zr-NMC811) at a 0.5C rate for 100 cycles of charge/discharge. The voltage range was 2.5-4.5 V.

In light of the analysis above, a synergy combining Al-surface modification and Zr-bulk modification was performed by coating A-20Zr-NMC811 particles with 4 cycles of $Al_2O_3$ ALD (~0.5 nm thick). The cyclic tests were performed at different C rates and 0.5C rate. FIG. 11A shows Al-A-20Zr-NMC811 remained a good rate capability as A-20Zr-NMC811 did, indicating that the 4 cycles of $Al_2O_3$ ALD coating did not impact internal resistance of the coin cell. With $Al_2O_3$ ALD, in FIG. 11B, the initial specific capacity of Al-A-20Zr-NMC811 at a 0.5C rate was 208 mAh/g, with a capacity retention that improved from 51.1% of NMC811 to 75.3% of A-20Zr-NMC811 and, finally, to 85.9% of Al-A-20Zr-NMC811 after 200 cycles of charge/discharge. This was attributed to the synergy of surface protection by $Al_2O_3$ coating and improved structural stabilization by Zr-doping.

Example 10

Figure 12:
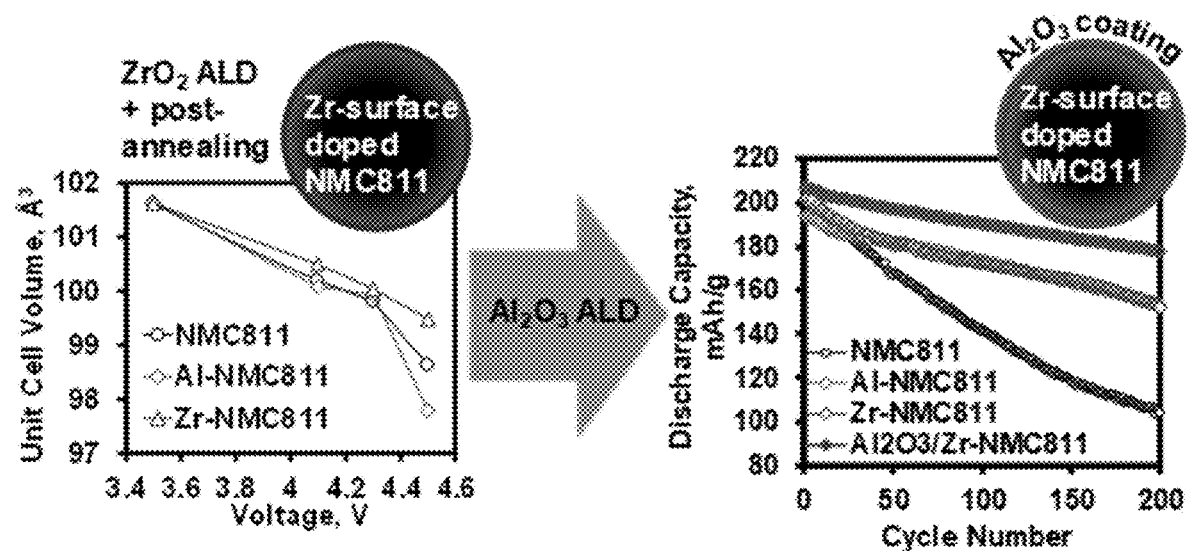
FIG. 12 depicts a summary schematic of the transition of Zr-surface doped NMC811 (from ZrO$_2$ ALD with post-annealing) to the addition of an Al$_2$O$_3$ coating.

In sum, NMC811 particles were co-modified by Zr surface-doping and $Al_2O_3$ coating. $Al_2O_3$ and $ZrO_2$ films were coated on NMC811 particles by ALD, followed by annealing. Formation of $LiAlO_2$ is the advantage of Al-based surface coating, which can improve surface chemistry of NMC811 and, thus, promote cyclic stability, but the Al doping aggravated lattice collapse during H2→H3 phase transition, which is not desirable. The Zr-doping expanded and supported lattice structure of NMC811 and thus improved $Li^+$ transport properties and structural stability. In light of this comparison, the performance of NMC811 was further improved by performing a design of Al-surface modification and Zr-doping that combining their synergetic effects. A summary schematic is found in FIG. 12, depicting the transition of Zr-surface doped NMC811 (from $ZrO_2$ ALD with post-annealing) to the addition of an $Al_2O_3$ coating.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above compositions and processes without departing from the scope of the invention, it is intended that all matter contained in the above description and shown in the accompanying drawings shall be interpreted as illustrative and not in a limiting sense.

The invention claimed is:

1. A lithium battery cathode comprising:
a doped lithium metal oxide comprising a dopant comprising zirconium;
a coating comprising the dopant at least partially coating the doped lithium metal oxide; and
a coating comprising alumina at least partially coating the doped lithium metal oxide or the coating comprising the dopant;
wherein the coating comprising the dopant and the coating comprising the alumina are deposited by atomic layer deposition, respectively;
wherein the doped lithium metal oxide is in the form of one or more particles; and
wherein the doped lithium metal oxide comprises a lithium nickel manganese cobalt oxide.

2. The lithium ion battery cathode of claim 1 wherein the lithium metal oxide is represented by the formula $LiNi_xMn_yCo_{1-x-y}O_2$ (NMC).

3. The lithium ion battery cathode of claim 1 wherein the doped lithium metal oxide comprises NMC811.

4. The lithium ion battery cathode of claim 1 wherein the thickness of the coating comprising alumina is from about 0.1 nm to 30 nm.

5. The lithium ion battery cathode of claim 1 wherein the thickness of the coating comprising alumina is from about 0.1 nm to 10 nm.

6. The lithium ion battery cathode of claim 1 wherein the thickness of the coating comprising alumina is from about 0.1 nm to about 3 nm.

7. A lithium ion battery comprising:
a positive electrode comprising the lithium ion battery cathode of claim 1,
a negative electrode,
a separator between the positive electrode and the negative electrode, and
an electrolyte comprising lithium ions.

8. A process of preparing the lithium ion battery cathode of claim 1, the process comprising:
depositing a coating comprising a dopant comprising zirconium on at least a portion of a doped lithium metal oxide; and
depositing a coating comprising alumina on at least a portion of the doped lithium metal oxide or the coating comprising the dopant;
wherein the doped lithium metal oxide comprises a dopant comprising zirconium.

9. The process of claim 8 wherein the coating comprising alumina is deposited by atomic layer deposition.

10. The process of claim 8, further comprising annealing the lithium ion battery cathode.

11. The process of claim 9, further comprising annealing the lithium ion battery cathode.

12. The process of claim 10 wherein the annealing is conducted in an oxygen-containing atmosphere and at a temperature of 600° C. or greater.

13. The process of claim 10 wherein the annealing is conducted in an oxygen-containing atmosphere and at a temperature of about 750° C. or greater.

14. The process of claim 8, further comprising modifying a lithium metal oxide with a dopant comprising zirconium to form the doped lithium metal oxide.

15. The process of claim 9, further comprising modifying a lithium metal oxide with a dopant comprising zirconium to form the doped lithium metal oxide.

16. The process of claim 10, further comprising modifying a lithium metal oxide with a dopant comprising zirconium to form the doped lithium metal oxide.

17. The process of claim 14 wherein the lithium metal oxide is modified with the dopant comprising zirconium by atomic layer deposition.

18. The process of claim 14, further comprising annealing the doped lithium metal oxide prior to depositing the coating comprising alumina on a doped lithium metal oxide.

19. The process of claim 17, further comprising annealing the doped lithium metal oxide prior to depositing the coating comprising alumina on a doped lithium metal oxide.

* * * * *